US012674675B2

(12) United States Patent
St. Gray et al.

(10) Patent No.: US 12,674,675 B2
(45) Date of Patent: Jul. 7, 2026

(54) METHOD AND SYSTEM OF DELIVERING DATA TO A VEHICLE

(71) Applicants: NISSAN NORTH AMERICA, INC., Franklin, TN (US); NISSAN MOTOR CO., LTD., Yokohama (JP)

(72) Inventors: Erik St. Gray, Tacoma, WA (US); Liam Pedersen, San Francisco, CA (US); Corey Heath, Tempe, AZ (US); Mark Bailey, Seattle, WA (US); Marcell Vazquez-Chanlatte, Palo Alto, CA (US); Stefan Witwicki, San Carlos, CA (US); Gregory Vera, Atsugi (JP); Vincent Jones, Atsugi (JP); He Li, Atsugi (JP); Takeshi Hirano, Atsugi (JP)

(73) Assignees: NISSAN NORTH AMERICA, INC., Franklin, TN (US); NISSAN MOTOR CO., LTD., Yokohama (JP)

( * ) Notice: Subject to any disclaimer, the term of this patent is extended or adjusted under 35 U.S.C. 154(b) by 282 days.

(21) Appl. No.: 18/089,383

(22) Filed: Dec. 27, 2022

(65) Prior Publication Data

US 2024/0210195 A1     Jun. 27, 2024

(51) Int. Cl.
*G01C 21/36* (2006.01)
*G06F 16/29* (2019.01)
(52) U.S. Cl.
CPC ......... *G01C 21/3614* (2013.01); *G06F 16/29* (2019.01)

(58) Field of Classification Search
None
See application file for complete search history.

(56) References Cited

U.S. PATENT DOCUMENTS

| | | | | |
|---|---|---|---|---|
| 9,467,515 B1 * | 10/2016 | Penilla | .................. | H04L 67/306 |
| 9,581,457 B1 * | 2/2017 | Meredith | ........... | G01C 21/3679 |
| 10,952,054 B2 | 3/2021 | Bajwa et al. | | |
| 11,214,145 B2 | 1/2022 | Miller, Jr. et al. | | |
| 2010/0168995 A1 * | 7/2010 | Van Der Meer | .... | G06F 16/9537 |
| | | | | 707/706 |
| 2012/0105476 A1 * | 5/2012 | Tseng | .................. | G01C 21/3632 |
| | | | | 345/633 |
| 2012/0150436 A1 * | 6/2012 | Rossano | ............ | G01C 21/3694 |
| | | | | 701/425 |
| 2013/0069798 A1 * | 3/2013 | Jones | ................... | G08G 1/0967 |
| | | | | 340/905 |
| 2013/0158873 A1 * | 6/2013 | Rhee | .................. | G01C 21/3874 |
| | | | | 701/400 |
| 2014/0274107 A1 * | 9/2014 | Rados | ................ | G01C 21/3617 |
| | | | | 705/14.66 |
| 2015/0006077 A1 * | 1/2015 | Baid | .................. | G01C 21/3614 |
| | | | | 701/538 |
| 2018/0164119 A1 * | 6/2018 | Becker | ................ | B60W 60/001 |

(Continued)

*Primary Examiner* — James J Lee
*Assistant Examiner* — Melanie G Huber
(74) *Attorney, Agent, or Firm* — Spencer Fane, LLP

(57) ABSTRACT

A method of delivering data to a vehicle including transmitting a request for the data from a vehicle to a database. The data stored in the database is tagged with location information. A location of the vehicle is determined. The data in the database tagged with location information within a predetermined distance of the determined location of the vehicle is determined. The data is delivered to the vehicle based on the determined location of the vehicle. The delivered data is displayed on a display disposed in the vehicle.

20 Claims, 17 Drawing Sheets

(56) References Cited

U.S. PATENT DOCUMENTS

| | | | | |
|---|---|---|---|---|
| 2018/0254022 A1* | 9/2018 | Shahal | .................... | G09G 5/37 |
| 2019/0050906 A1* | 2/2019 | Nomura | ................ | G01S 5/0027 |
| 2021/0389138 A1* | 12/2021 | Morton | ............ | G08G 1/096791 |
| 2023/0332915 A1* | 10/2023 | Lee | ........................ | B60K 35/10 |

* cited by examiner

METHOD AND SYSTEM OF DELIVERING DATA TO A VEHICLE

BACKGROUND

Technical Field

The present disclosure generally relates to a method and system of delivering data to a vehicle. More specifically, the present disclosure relates to a method and system of delivering data to a vehicle based on a current location of the vehicle.

Background Information

A vehicle occupant typically spends at least an hour each day in their vehicle. Time is spent in the vehicle commuting to work, running errands, or driving with family. A vehicle occupant currently can listen to music, audiobooks, or podcasts during time spent in the vehicle. An occupant in a rear seat of the vehicle can watch television shows or movies on displays integrated in the vehicle. The existing content deliverable to the vehicle is not based on a current location of the vehicle.

SUMMARY

A need exists for data deliverable to a vehicle based on a current location of the vehicle. The data delivery method and system of the present disclosure provides learning and educational content to the vehicle. The delivered content includes content oriented toward adults and working professionals that is tailored for delivery based on the current location of the vehicle. The data delivery method and system of the present disclosure further provides unique opportunities for enhancing learning and knowledge of an occupant in the vehicle.

In view of the state of the known technology, one aspect of the present disclosure is to provide a method of delivering data to a vehicle. A request for the data is transmitted from a vehicle to a database. The data stored in the database is tagged with location information. A location of the vehicle is determined. The data in the database tagged with location information within a predetermined distance of the determined location of the vehicle is determined. The data is delivered to the vehicle based on the determined location of the vehicle. The delivered data is displayed on a display disposed in the vehicle.

Another aspect of the present disclosure is to provide a vehicle data delivery system including a database, a navigational system, a wireless communication system, and a first display. The database is configured to store data. The data stored in the database is tagged with location information. The navigational system is disposed in a vehicle and is configured to determine a location of the vehicle. The wireless communication system is disposed in the vehicle and is configured to transmit requests from the vehicle to the database and to receive data delivered by the database. The delivered data is tagged with location information within a predetermined distance of the determined location of the vehicle. The first display is disposed in the vehicle and is configured to display the data delivered from the database.

Also other objects, features, aspects and advantages of a method and system of delivering data to a vehicle will become apparent to those skilled in the art from the following detailed description, which, taken in conjunction with the annexed drawings, discloses exemplary embodiments of the method and system of delivering data to a vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
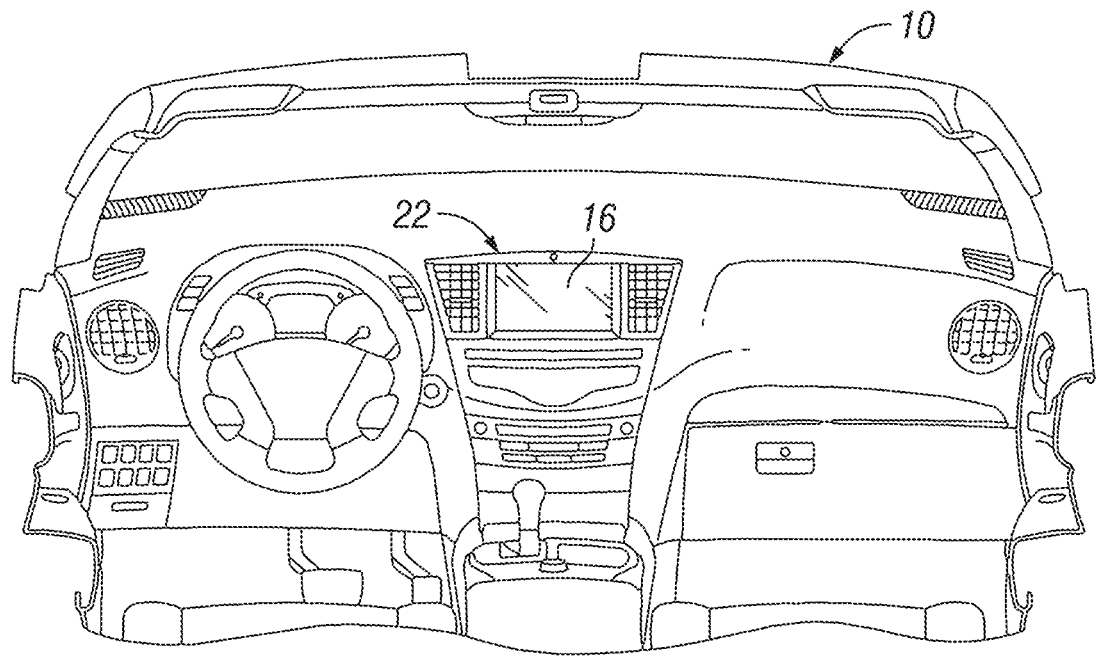
FIG. 1 is a perspective view of a passenger compartment of a vehicle in accordance with an exemplary embodiment.
Figure 2:
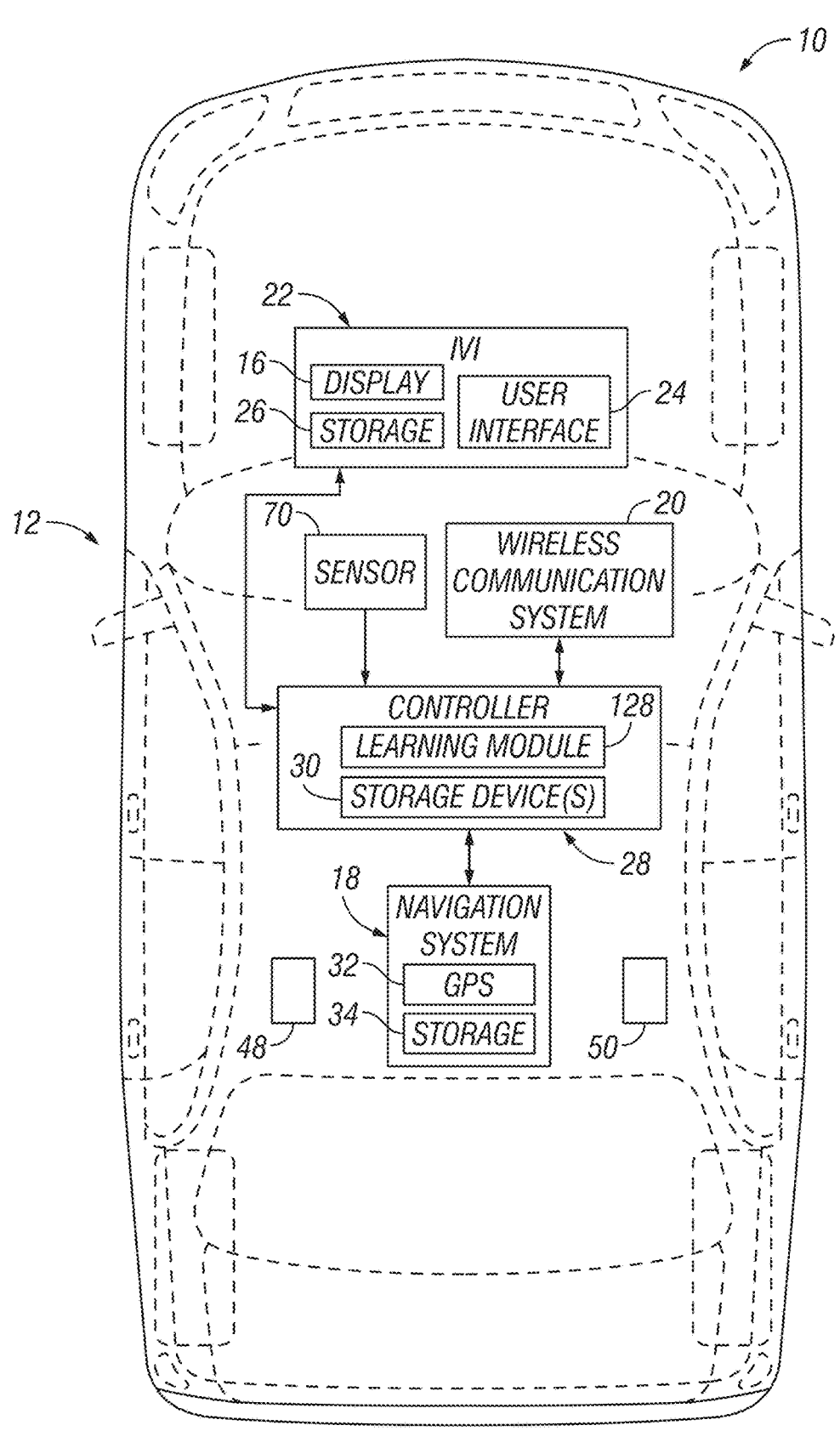
FIG. 2 is a schematic diagram of a vehicle data delivery system of the vehicle of FIG. 1.
Figure 4:
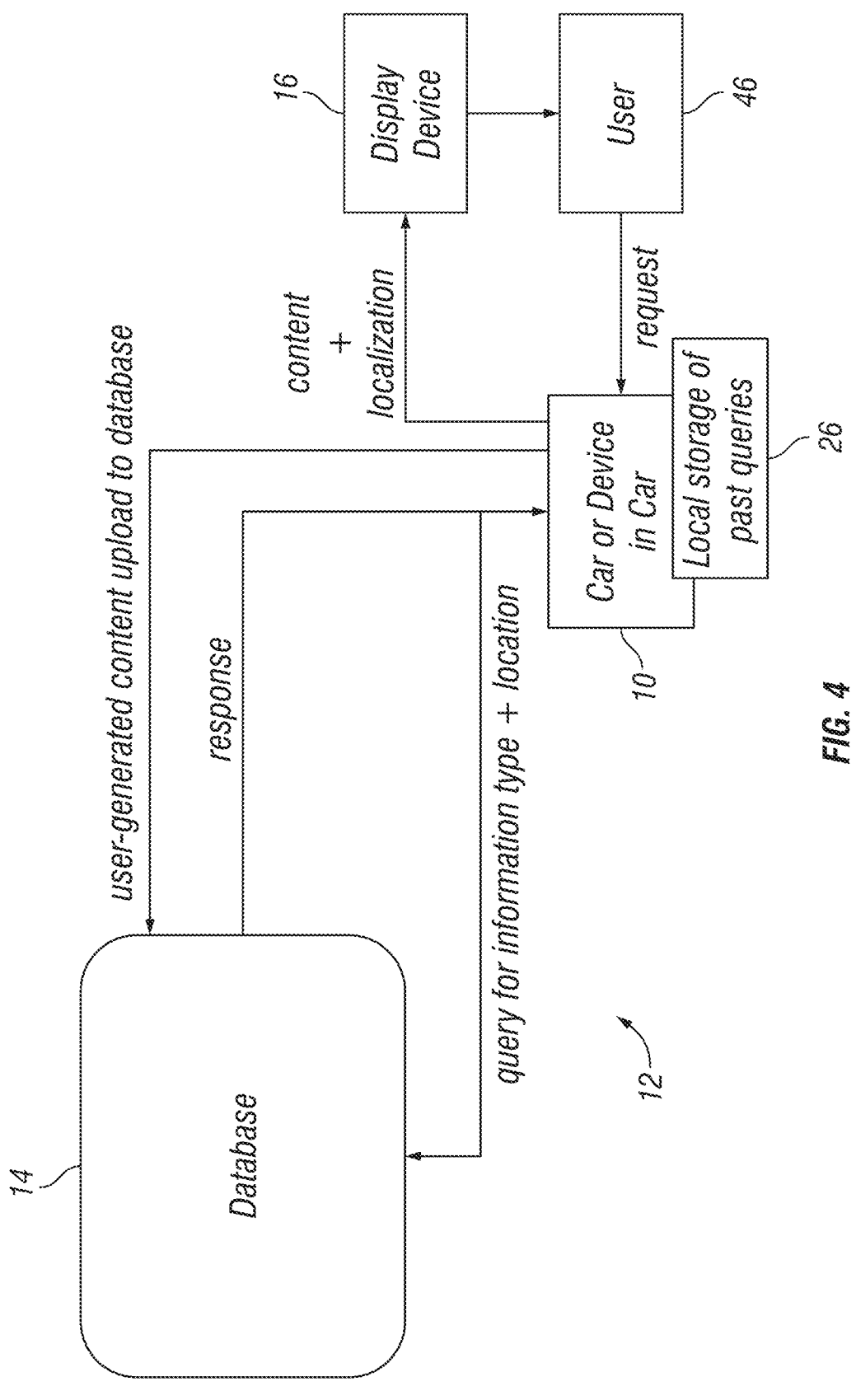
FIG. 4 is a schematic illustration of the vehicle delivery system of the exemplary embodiment.

Referring initially to FIGS. 1, 2 and 4, a vehicle 10 in accordance with an exemplary embodiment includes a data delivery system 12. A request for data is transmitted from the vehicle 10 to a database 14. The data stored in the database 14 is tagged with location information. A location of the vehicle 10 is determined. The data in the database 14 tagged with location information within a predetermined distance of the determined location of the vehicle 10 is determined. The data is delivered to the vehicle 10 based on the determined location of the vehicle 10. The delivered data is displayed on a display 16 disposed in the vehicle 10. The vehicle data delivery system 12 includes the database 14, a navigational system 18, a wireless communication system 20, and the display 16, as shown in FIGS. 1, 2 and 4. The database 14 is preferably remote from the vehicle 10, although the database can be disposed in the vehicle 10.

An in-vehicle infotainment system (IVI) 22 includes the display 16, a user interface 24, and a storage device 26. The display 16 preferably includes conventional touch screen controls. The user interface 24 and the display 16 allow a vehicle occupant to interact with the vehicle data delivery system 12, such as by selecting options or inputting information as necessary. The storage device 26 is configured to store programs and/or information, such as programs and/or information associated with the vehicle data delivery system 12.

An electronic controller 28 preferably includes a microcomputer with a control program that is configured to control the components of the vehicle data delivery system 12 as discussed below. The controller 28 includes other conventional components, such as an input interface circuit, an output interface circuit, and storage device(s), such as a ROM (Read Only Memory) device and a RAM (Random Access Memory) device. The microcomputer of the controller 28 is at least programmed to control the vehicle data delivery system 12 in accordance with the schematic illustrations of FIGS. 5-17 as discussed below. The microcomputer of the controller 28 is programmed to control the IVI 22, the navigation system 18, and the wireless communication system 20, and to make determinations or decisions, as discussed herein. The memory circuit stores processing results and control programs, such as ones for the IVI 22, the navigation system 18, and the wireless communication system 20. The controller 26 is operatively coupled to the IVI 22, the navigation system 18, and the wireless communication system 20 in a conventional manner, as well as other electrical systems in the host vehicle 10, such the turn signals, windshield wipers, lights and any other suitable systems. Such a connection enables the controller 26 to monitor and control any of these systems as desired. The internal RAM of the controller 26 stores statuses of operational flags and various control data. The internal ROM of the controller 26 stores the information for various operations. The controller 26 is capable of selectively controlling any of the components of the vehicle data delivery system 12 in accordance with the control program. It will be apparent to those skilled in the art from this disclosure that the precise structure and algorithms for the controller 26 can be any combination of hardware and software that will carry out the functions of the exemplary embodiments of the present disclosure. Furthermore, the controller 26 can communicate with the other components of the vehicle data delivery system 12 discussed herein via, for example a controller area network (CAN) bus or in any other suitable manner as understood in the art.

The controller 26 can include or be in communication with the user interface 24 of the IVI 22. The user interface 22 can include, for example, a human-machine interface (HMI), such as a control panel or a touchscreen graphical user interface (GUI), which enables a user (e.g., the driver and/or passenger) to interact with the vehicle data delivery system 12 as understood in the art and discussed herein. The user interface 22 can be incorporated with the display 16 to facilitate interaction by the user. The controller 26 can further include or be in communication with one or more storage devices 30, such as a vehicle memory, that can store information as described herein.

The vehicle data delivery system 12 of the host vehicle 10 includes the vehicle navigation system 18, as shown in FIG. 2. The vehicle navigation system 18 includes, for example, a communication device 32, such as a GPS (Global Positioning System) communication device, that communicates with the GPS satellites. The communication device 32 can also communicate with one or more terrestrial units and a base station or external server to obtain location information. Furthermore, the vehicle navigation system 18 can include or is in communication with a storage device 34 that can store vehicle information, such as previous vehicle route information, location information, or other vehicle information that the GPS is capable of generating, in addition to map data and other location related data as understood in the art. The vehicle navigation system 18 can receive vehicle data from any suitable source, such as a remote device capable of connecting with the navigation system 18.

Figure 5:
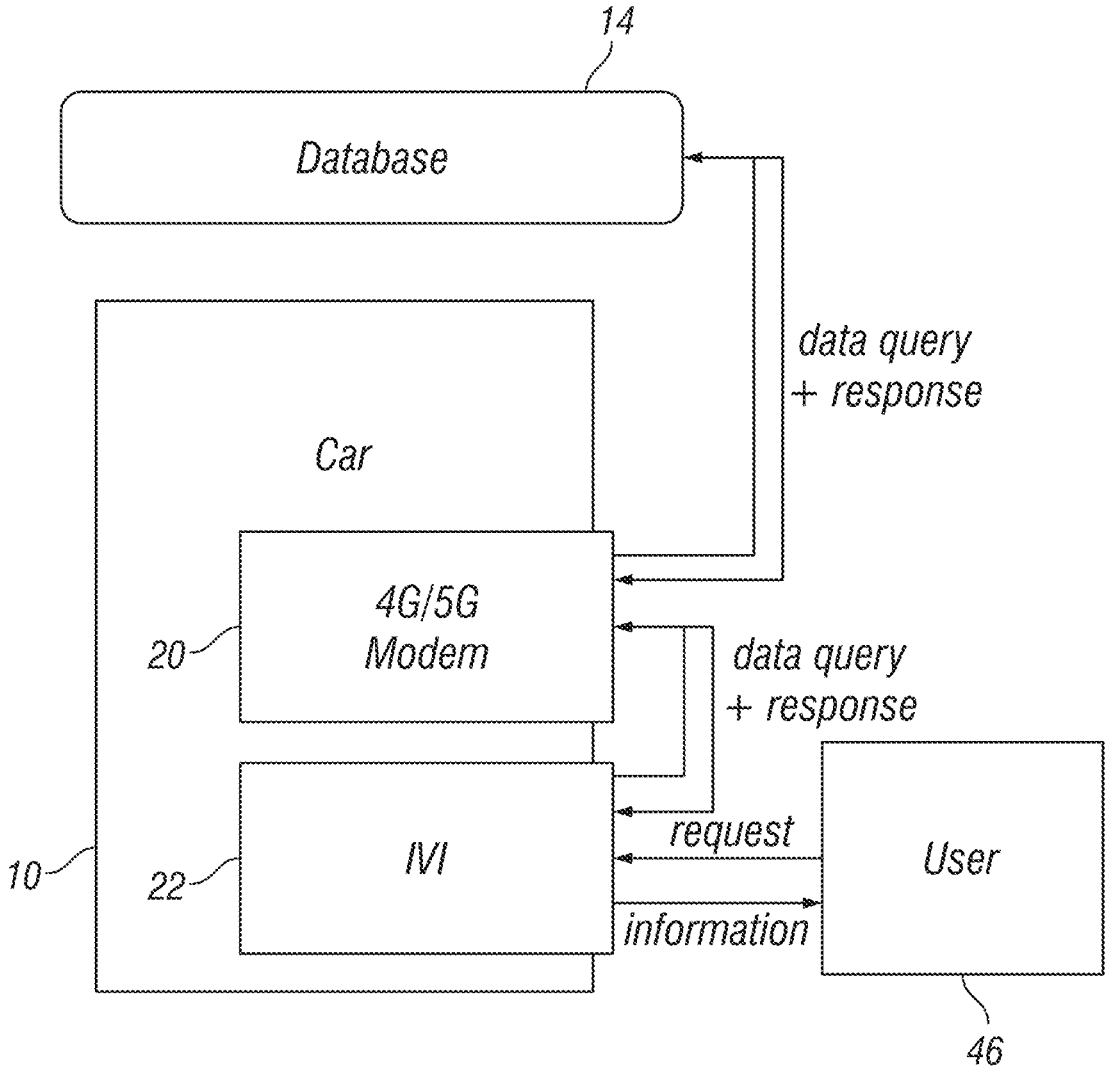
FIG. 5 is a schematic illustration of a vehicle communication system in accordance with the exemplary embodiment.
Figure 6:
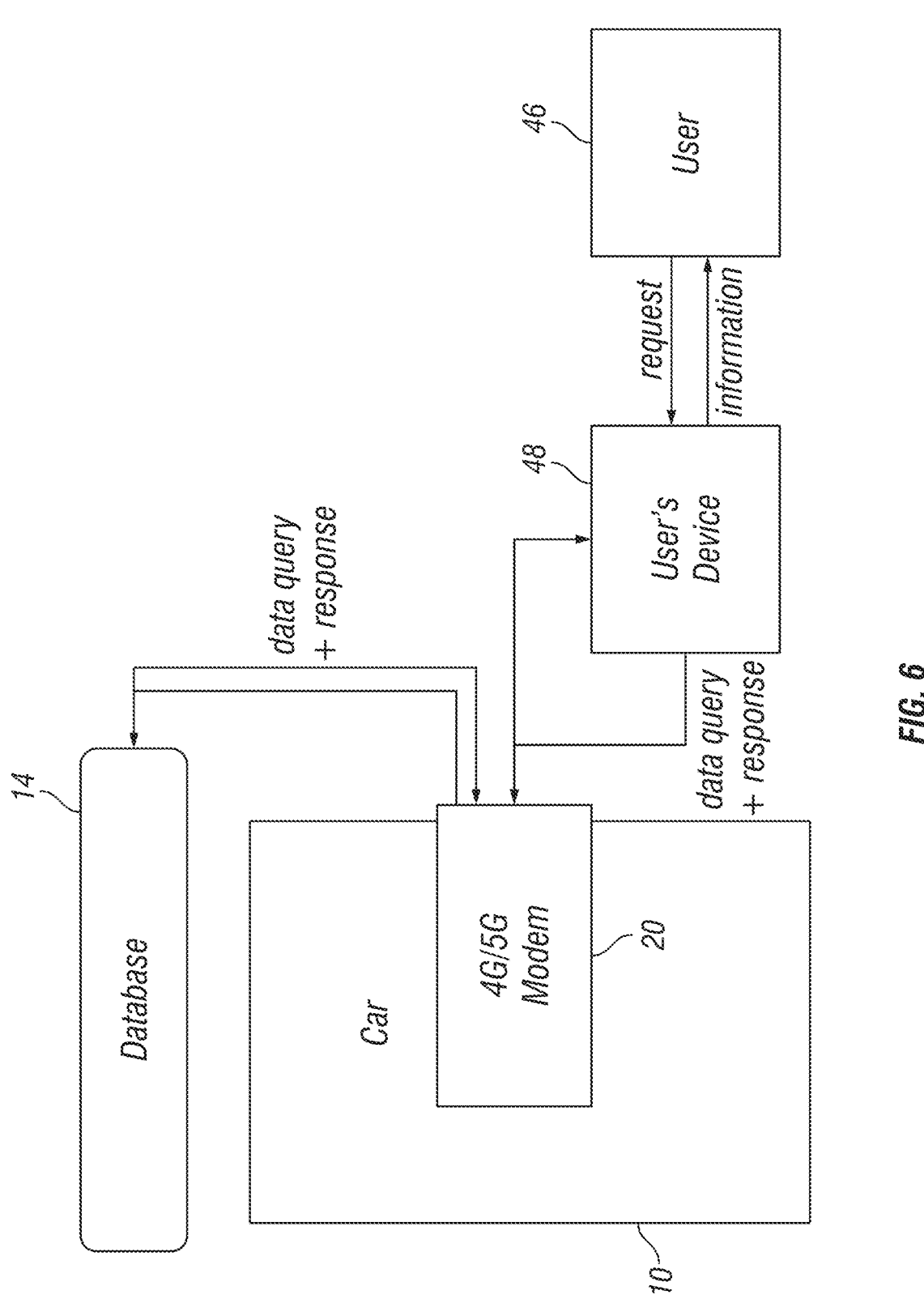
FIG. 6 is a schematic illustration of an alternative vehicle communication system.

The vehicle data delivery system 12 of the host vehicle 10 further includes the wireless communication system 20, as shown in FIG. 2. The wireless communication system 20 is a communication transceiver for performing a wireless communication with an external wireless communication device, as is understood in the art. The wireless communication system 20 can be configured for short-range wireless communication, such as Bluetooth, and/or for communication over a wireless network. The wireless communication system 20 preferably includes a 4G/5G modem, as shown in FIGS. 5 and 6.

Figure 3:
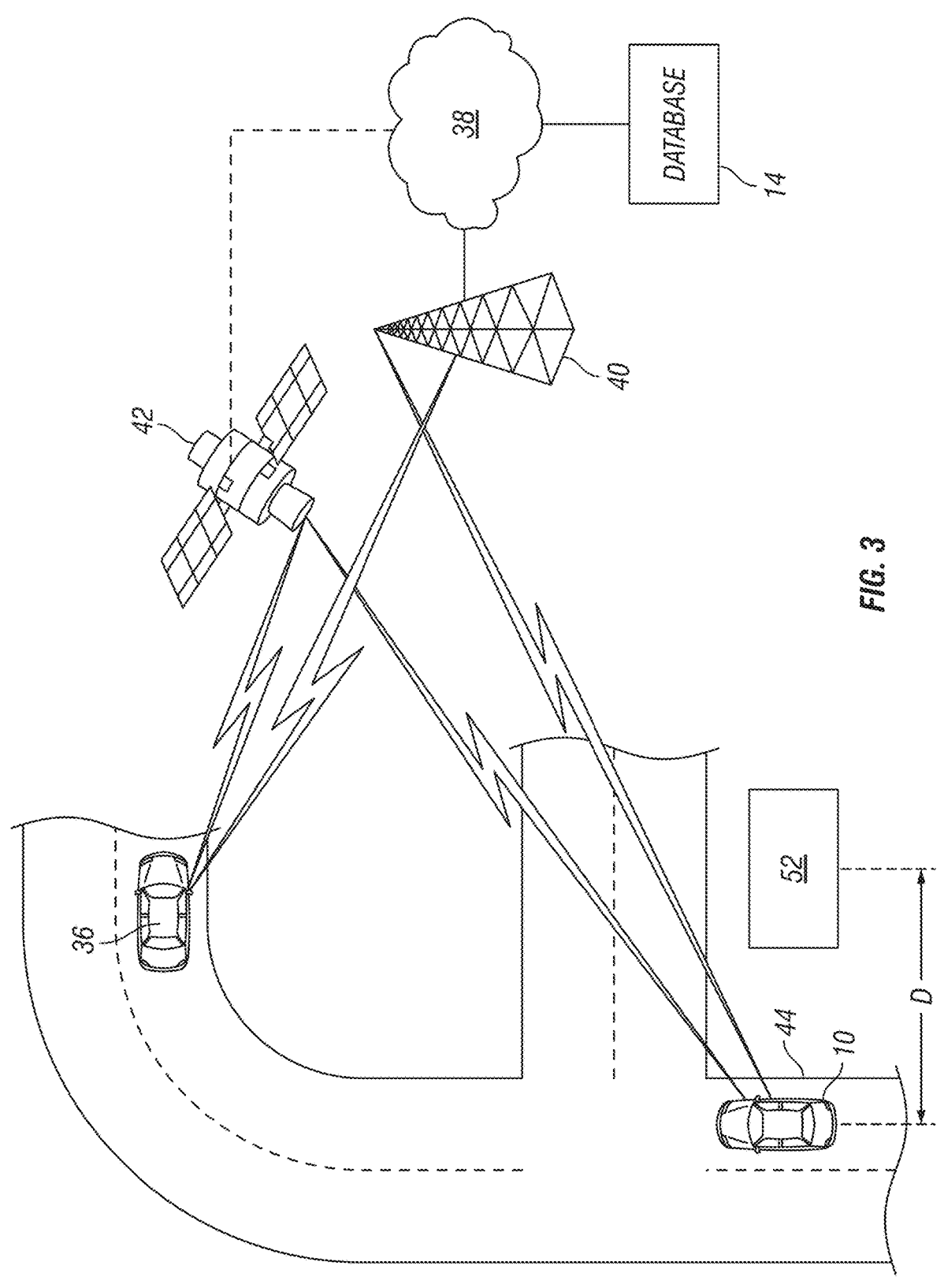
FIG. 3 is a schematic diagram of a communication network of the vehicle of FIG. 1.

As shown in FIG. 3, the host vehicle 10 and another vehicle 36 are in wireless communication with a communication network 38 to upload and receive data from the database 14. The host vehicle 10 and the other vehicle 36 may communicate with the communication network, or remote server, 38 via an access point 40. The access point 40, which may include a computing device, may be configured to communicate with the host vehicle 10, the other vehicle 36, the communication network 38, or with a combination thereof via wired or wireless communication links. For example, the access point 40 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 3, the access point 40 may include any number of interconnected elements.

The host vehicle 10 and the other vehicle 36 may communicate with the communication network, or remote server, 38 via a satellite 42, or other non-terrestrial communication device. The satellite 42, which may include a computing device, may be configured to communicate with the host vehicle 10, the other vehicle 36, with the communication network 38, or with a combination thereof via one or more communication links. Although shown as a single unit in FIG. 3, the satellite 42 may include any number of interconnected elements.

The electronic communication network, or remote server, 38 may be any type of network configured to provide for voice, data, or any other type of electronic communication. For example, the electronic communication network 38 may include a local area network (LAN), a wide area network (WAN), a virtual private network (VPN), a mobile or cellular telephone network, the Internet, a cloud server, a remote database, or any other electronic communication system. The electronic communication network 38 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 3, the electronic communication network 38 may include any number of interconnected elements.

As shown in FIGS. 3 and 4, the vehicle 10 is traveling along a road 44 and a vehicle occupant 46 sees an object of interest 52. A request for information about the object of interest 52 is transmitted from the vehicle 10 to the database 14. The transmitted request includes the current location of the vehicle 10 determined by the navigation system 18. The request can be initiated through the interface 24 of the IVI 22 or can be initiated from a mobile device 48 of a vehicle occupant. The database 14 receives the request for information, and determines the data in the database tagged with location information within a predetermined distance D of the determined location of the vehicle 10. The data is delivered from the database 14 to the vehicle 10 based on the determined location of the vehicle 10. The delivered data is displayed on a display disposed in the vehicle 10. The display can be the display 16 of the IVI 22, or a display of a mobile device 48. The predetermined distance D can be set by the user for any suitable distance, such as ten or twenty miles. Alternatively, the predetermined distance can be tagged in the content uploaded to the database 14.

Prior to traveling in the vehicle 10, the user 46 can input a destination in the navigation system 18 of the vehicle, as shown in FIG. 2. The navigation system 18 determines a route to the destination. The data in the database 14 tagged with location information along the route of the vehicle 10 is determined. The data is delivered to the vehicle 10 based on the route of the vehicle 10. The delivered data is displayed on the display 16 of the IVI 22 located in the vehicle 10.

As shown in FIGS. 4-8, the user 46 can access the database 14 in any suitable manner. As shown in FIG. 5, the user 46 accesses the database 14 through the wireless communication system 20 of the vehicle 10. The user 46 directly enters a request through the interface 24 (FIG. 2) of the IVI, which is transmitted to the wireless communication system 20. The wireless communication system 20 transmits the data query, including the current location of the vehicle 10, to the database 14. The database 14 transmits data responsive to the data query to the wireless communication system 20 of the vehicle 10. The received data is transmitted to the IVI 22 and can be accessed by the user 46. As shown in FIG. 4, the received data is stored/cached in the storage device 26 of the IVI 22 to provide quicker and more efficient retrieval by the user 46.

As shown in FIG. 6, the user 46 accesses the database 14 through the wireless communication system 20 of the vehicle 10. The user 46 directly enters a request through the mobile device 48. The mobile device 48 transmits the request to the wireless communication system 20. The wireless communication system 20 transmits the data query, including the current location of the vehicle 10, to the database 14. The database 14 transmits data responsive to the data query to the wireless communication system 20 of the vehicle 10. The received data is transmitted to the mobile device 48 and can be accessed by the user 46 on the mobile device 48.

Figure 7:
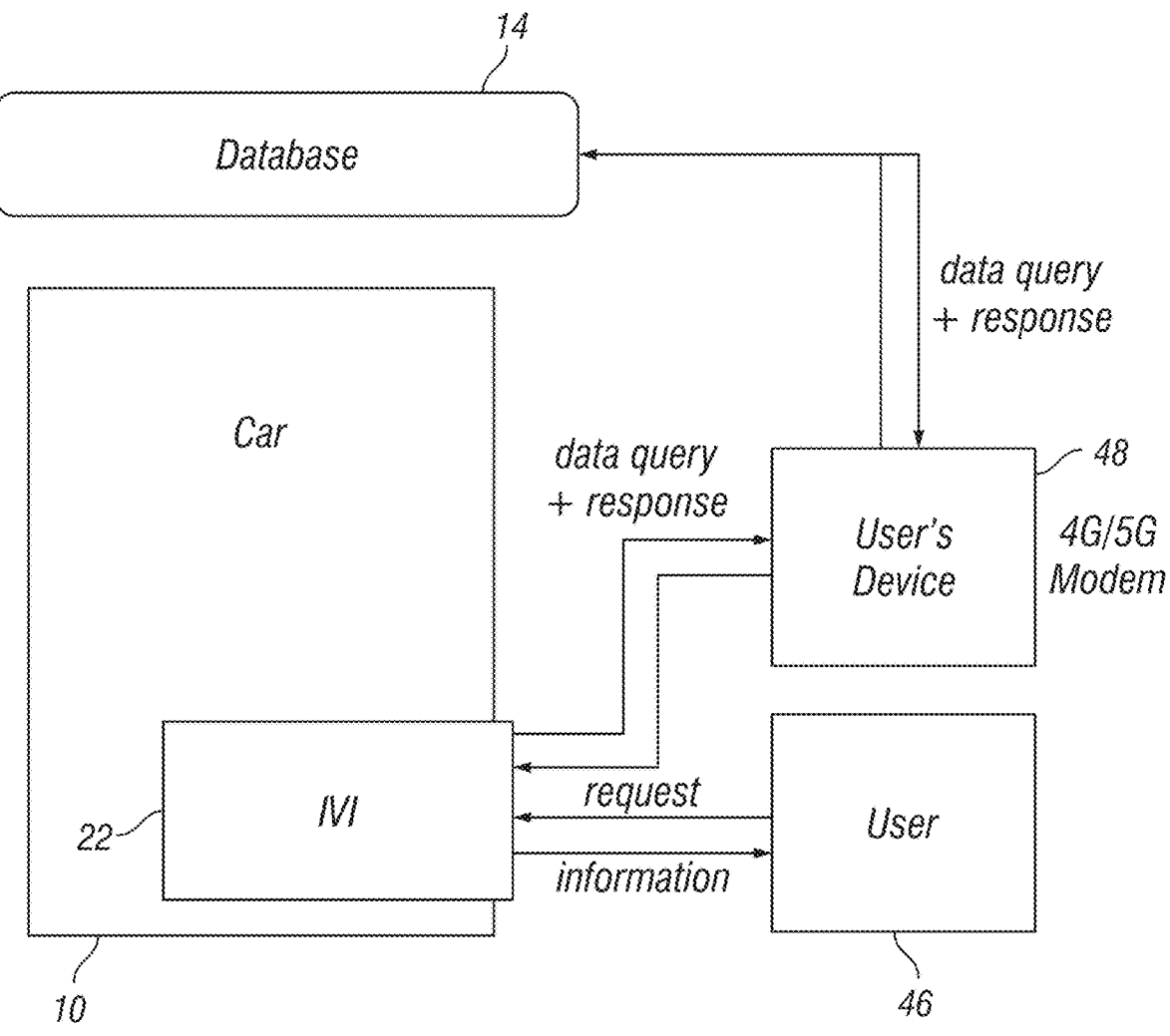
FIG. 7 is a schematic illustration of another alternative vehicle communication system.

As shown in FIG. 7, the user 46 accesses the database 14 through the mobile device 48. The user 46 directly enters a request through the interface 24 (FIG. 2) of the IVI 22, which is transmitted to the mobile device 48. The IVI 22 also transmits the current location of the vehicle 10 to the mobile device 48. The mobile device 48 transmits the data query, including the current location of the vehicle 10, to the database 14. The mobile device 48 preferably includes a 4G/5G modem to communicate with the database 14, although the mobile device 48 can communicate with the database 14 in any suitable manner. The database 14 transmits data responsive to the data query to the mobile device 48. The received data is transmitted to the IVI 22 and can be accessed by the user 46. As shown in FIG. 4, the received data is stored/cached in the storage device 26 of the IVI 22 to provide quicker and more efficient retrieval by the user 46.

Figure 8:
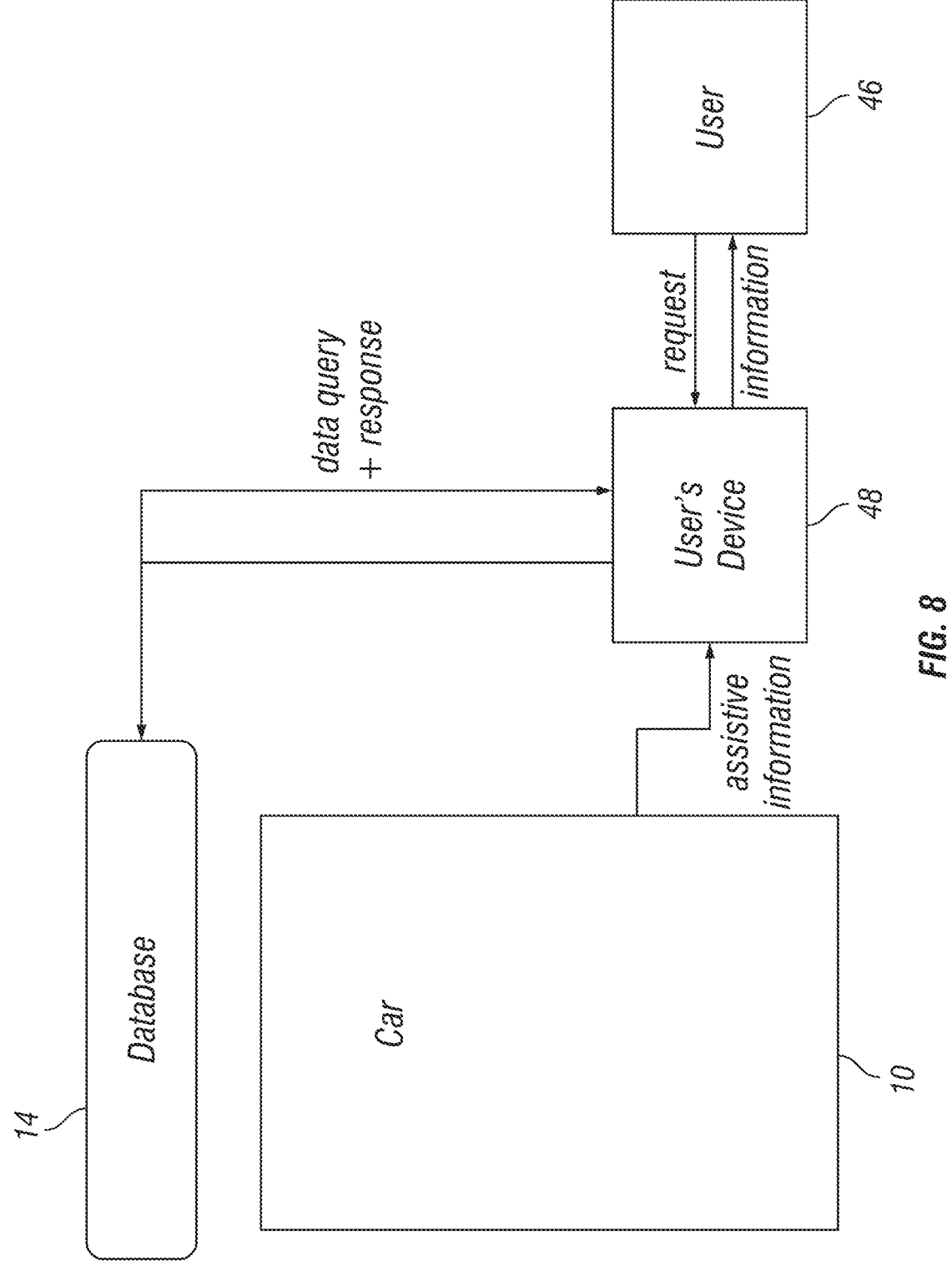
FIG. 8 is a schematic illustration of another alternative vehicle communication system.

As shown in FIG. 8, the user 46 accesses the database 14 through the mobile device 48. The user 46 directly enters a request through the mobile device 48. The mobile device 48 receives assistive information from the vehicle 10. The assistive information includes, but is not limited to, credentials to access the database 14 and the current location of the vehicle 10. The mobile device 48 transmits the data query, including the assistive information received from the vehicle 10, to the database 14. The mobile device 48 preferably includes a 4G/5G modem to communicate with the database 14, although the mobile device 48 can communicate with the database 14 in any suitable manner. The database 14 transmits data responsive to the data query to the mobile device 48. The received data is accessed by the user 46 with the mobile device 48.

Figure 9:
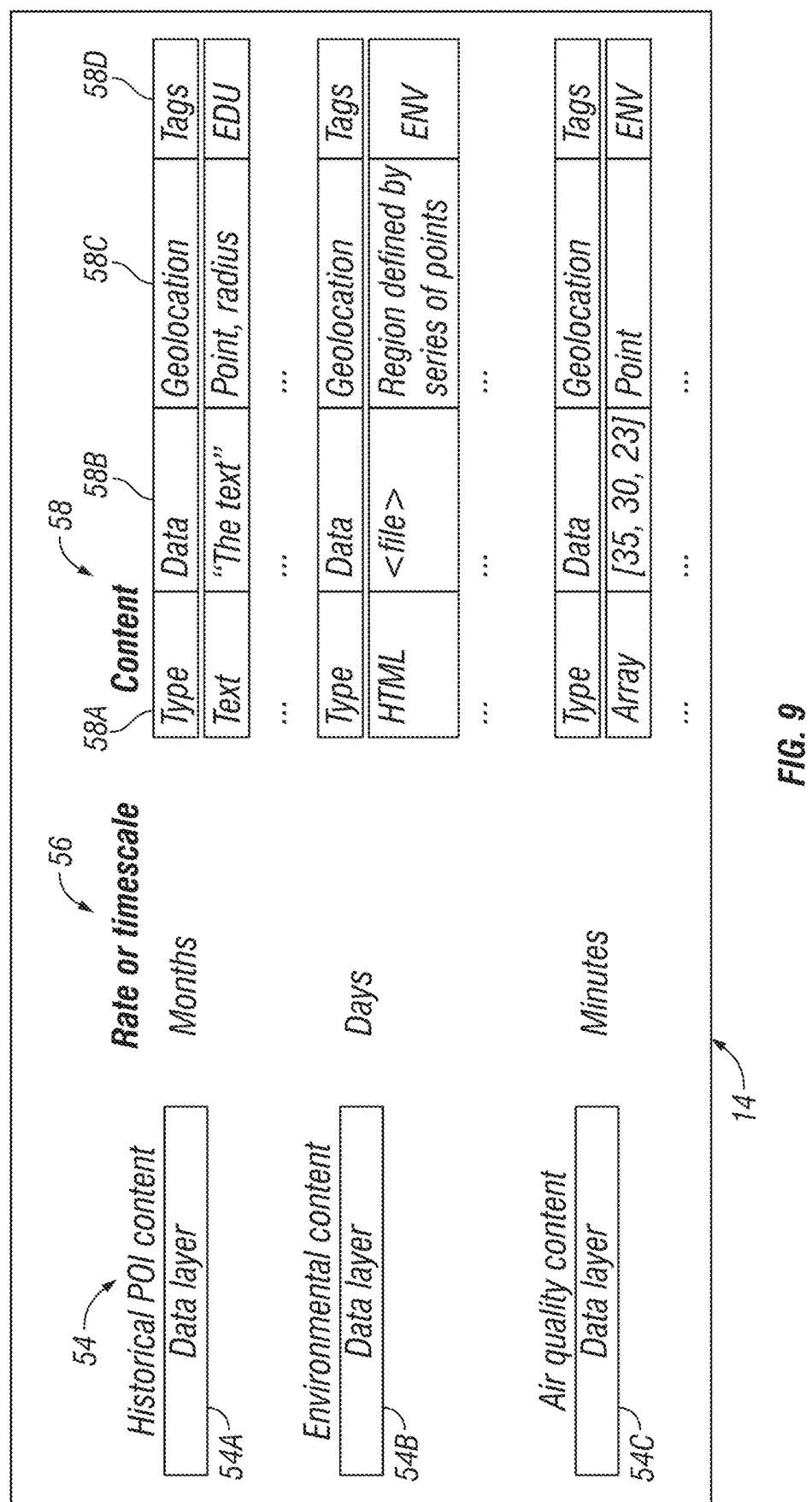
FIG. 9 is an exemplary database layout for the vehicle delivery system.

An exemplary layout of the database 14 is shown in FIG. 9. The layout of the database 14 includes a subject matter layer 54, a rate or timescale layer 56, and a content layer 58. The subject matter layer 54 includes a plurality of subject matters to provide educational content to the user 46 in the vehicle 10. The subject matter layer can include, but is not limited to, historical point of interest (POI) content, historical maps/regions content, current events content, environmental historical content, environmental historical maps/regions content, environmental current content, weather content, and air quality content.

The historical POI content can include points of interest, such as factories, universities, and battlegrounds, that are limited to a specific locale within a predetermined distance of the current location of the vehicle 10. The historical maps/regions content can include continuous content about the region, such as occupied territories, land ownership or inhabitation, within a predetermined distance of the current location of the vehicle 10. The current events content can include points of interest or events, such as museum shows, car meet-ups, that are current and could be attended, and are within a predetermined distance of the current location of the vehicle 10. The environmental historical content can include species that lived in a particular area, locations of fossil finds, or locations of geologic features of interest, within a predetermined distance of the current location of the vehicle 10. The environmental historical maps/regions content can include continuous content about regions, such as land/water boundaries, climate zones and transitions, conservation areas, within a predetermined distance of the current location of the vehicle 10. The environmental current content can include species that currently live in the area, or locations of fires/floods within a predetermined distance of the current location of the vehicle 10. The weather content can include typical weather information, from history to forecasts, for the area within a predetermined distance of the current location of the vehicle 10. The air quality content can include current and historical air quality index (AQI) information for the area within a predetermined distance of the current location of the vehicle 10.

The rate or timescale layer 56 is associated with each subject matter layer 54. The rate or timescale layer 56 controls how frequently the content of the subject matter layer 54 is refreshed. For example, the historical content layer 54A is refreshed every few months, such as after six months. The environmental content layer 54B is refreshed every few days, such as after two days. The air quality content layer 54C is refreshed every few minutes, such as after thirty minutes. The rate or timescale layer 56 can be set to refresh the data of the subject matter layer 54 at any suitable interval based on the type of content stored with the subject matter layer.

The content layer 58 includes a plurality of sub-layers, such as a type of content sub-layer 58A, a data sub-layer 58B, a geolocation sub-layer 58C, and a tag sub-layer 58D. The content sub-layer 58A indicates the type of content stored for the subject matter layer 54. The data sub-layer 58B includes the stored data for the subject matter layer 54. The geolocation sub-layer 58C indicates the location for the subject matter layer 54. The tag sub-layer 58D indicates the category of the subject matter layer 54.

As shown in FIG. 9, the historical content layer 54A includes text as the type of content stored in the content sub-layer 58A. The data sub-layer 58B stores the text for the historical content layer 54A. The geolocation sub-layer 58C includes a point at which the historical subject matter is located, and a radius from the point to set an area associated with the historical content layer. The tag sub-layer 58D identifies that the historical content layer 54A is educational (EDU). The database 14 returns the content associated with the historical content layer 54A when the current location of the vehicle 10 is within the area defined by the geolocation sub-layer 58C.

As shown in FIG. 9, the environmental content layer 54B includes HTML as the type of content stored in the content sub-layer 58A. The data sub-layer 58B stores the file for the environmental content layer 54B. The geolocation sub-layer 58C includes a region defined by a series of points for the area associated with the environmental content. The tag sub-layer 58D identifies that the environmental content layer 54B is environmental (ENV). The database 14 returns the content associated with the environmental layer 54B when the current location of the vehicle 10 is within the area defined in the geolocation sub-layer 58C.

As shown in FIG. 9, the air quality content layer 54C includes an array of data as the type of content stored. The data sub-layer 58B stores the arrays of data for the air quality content layer 54C. The geolocation sub-layer 58C includes a point at which the historical subject matter is located. The tag sub-layer 58D identifies that the air quality content layer 54C is environmental (ENV). The database 14 returns the content associated with the air quality layer 54C when the current location of the vehicle 10 is within a predetermined distance of the point defined in the geolocation sub-layer 58C.

Figure 10:
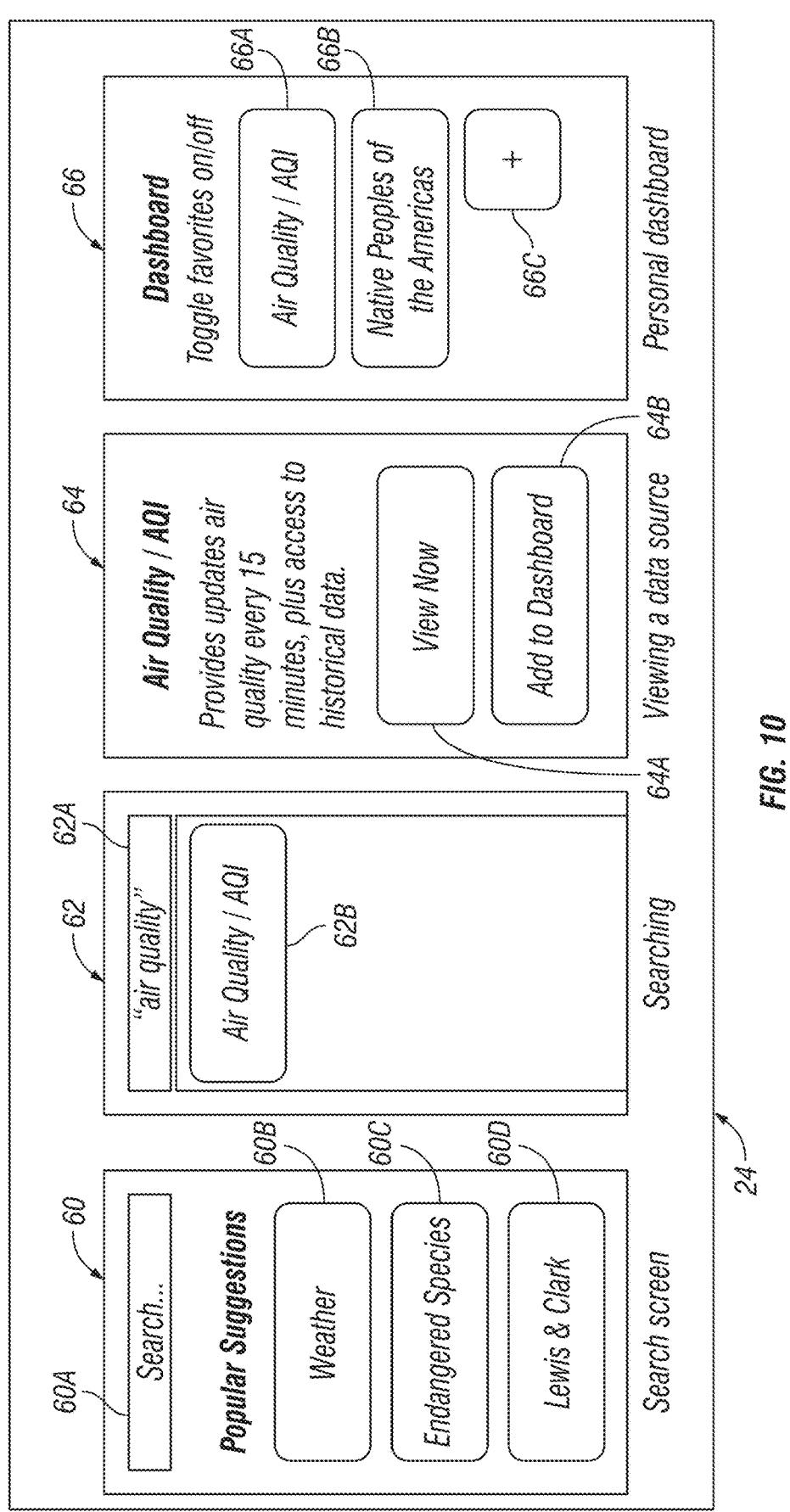
FIG. 10 is an exemplary interface for the vehicle delivery system.

The user interface 24 presents a searchable interface to the user. The user interface 24 provides access to data stored in the database 14, as shown in FIG. 10. The user can interact with the user interface 24 directly through the interface presented on the display 16 of the IVI 22 or through a mobile device 48. The mobile device 48 includes an application that communicates with the wireless communication system 20 of the vehicle 10 in any suitable manner, such as by Bluetooth or local WiFi.

The user interface 24 presents a search screen 60, as shown in FIG. 10. The search screen 60 displays a search window 60A in which the user can enter a specific search request to be transmitted to the database 14. Alternatively, clickable buttons 60B, 60C and 60D are displayed in which popular suggestions are presented. Button 60B presents a weather option, button 60C presents an endangered species option, and button 60C presents an option for explorers Lewis and Clark. The popular suggestions can be based on the most requested searches for a particular area, or any other suitable manner of ranking searches. The suggested data topics can be based on past transmitted requests. The transmitted request to the database 14 is based on the search query input through the interface 24 disposed in the vehicle 10.

The user interface 24 further presents a searching screen 62, as shown in FIG. 10. When the user enters air quality in the search window 60A in the search screen 60, the searching window displays the search term in the searching window 62A and displays at least one clickable button 62B as the search result. The user can click the clickable button 62B to receive the data returned from the database 14 responsive to the search query.

The user interface 24 further presents a search results screen 64, as shown in FIG. 10. The search results screen 64 presents a first clickable button 64A that allows the user to view the data now. The search results screen 64 presents a second clickable button that allows the user to add the returned data to a dashboard 66 screen. The search results screen 64 provides an indication of the refresh rate for the returned data, which is based on the rate or timescale layer 56 associated with the returned data type stored in the database 14.

The user interface 24 further presents a dashboard screen 66, as shown in FIG. 10. A plurality of clickable buttons 66A, 66B and 66C are displayed corresponding to returned data content saved on the search results screen 64. A first clickable button 66A allows the user to access the air quality content, which is updated every fifteen minutes. A second clickable button 66B allows the user to access the data content directed to native peoples of the Americas. A third clickable button 66C includes a plus sign, which displays additional clickable buttons directed to other data content saved to the dashboard from the search results screen 64. Each of the clickable buttons on the dashboard screen 66 are configurable to indicate a type of data content, such as educational or environmental, a type of display for the data content, such as color, color and text, and any other suitable configurable option.

The data stored in the database 14 can be paired with in-app (from the mobile device 48) or on-screen (from the display 16 of the IVI 22) that allows the user to access additional paid features. Some data content can be associated with a particular viewing medium, such as a head-mounted display (HMD), such that the data content is only viewable when the appropriate viewing device is connected to the wireless communication system 20 of the vehicle 10.

The user interface 24 can also be configured to allow for generation and uploading of user generated content to the database 14. A user can upload ratings, such as star ratings, of data content. The user can generate content defined by a particular application, such as a restaurant rating application that allows user-generated reviews. The user-generated review can include, but is not limited to, videos, photos, text, and virtual reality (VR) experiences recorded or created by the user. A virtual collaborative application allows a user to explore a national park, and allows the user to develop and upload a customized character avatar visible to other users in virtual space. A citizen science platform can allow a user to upload to the database 14 a report about a sighting of an animal in a particular location, along with photographs and other relevant data.

Figure 11:
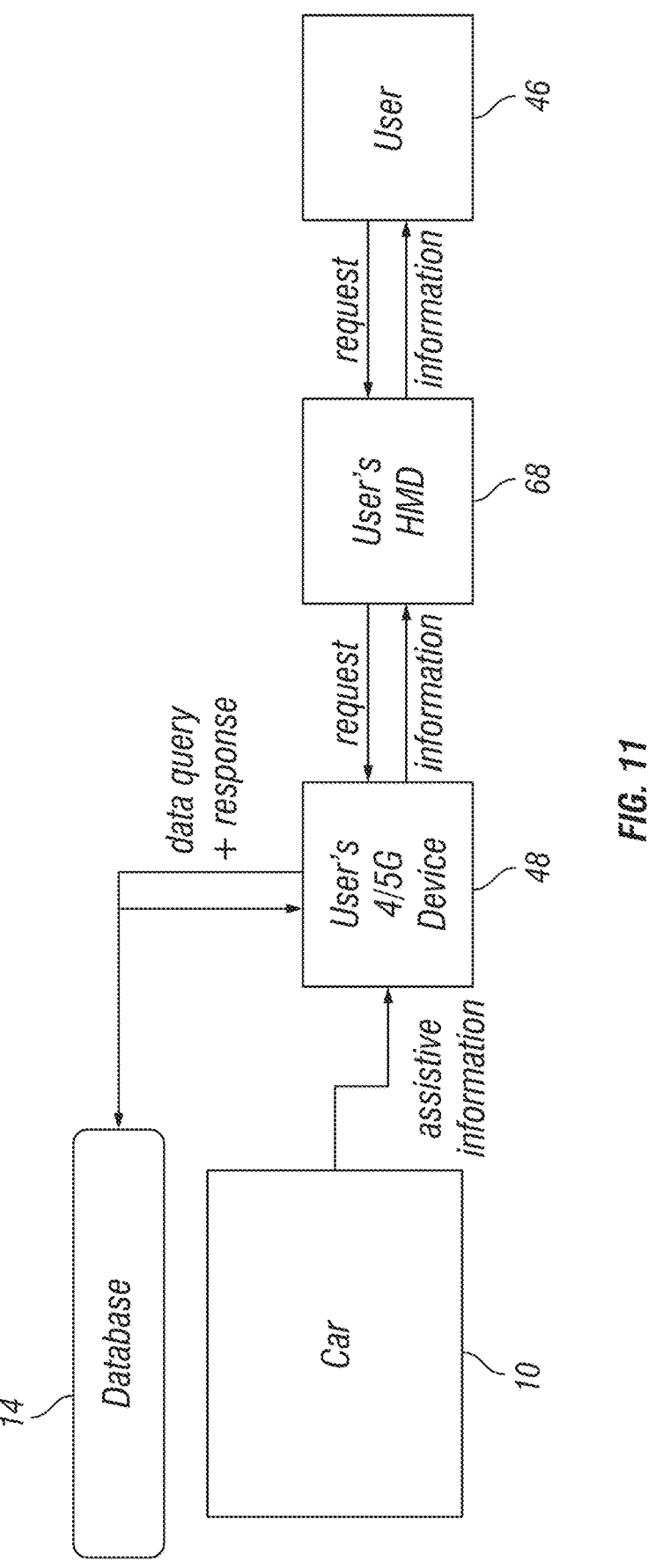
FIG. 11 is a schematic illustration of the vehicle delivery system.

As shown in FIG. 11, the user 46 access the database 14 through the mobile device 48, similarly to FIG. 8. As shown in FIG. 11, the user 46 enters a request for data content through a secondary device, such as a head-mounted display (HMD) 68. The mobile device 48 receives assistive information from the vehicle 10, and the request from the HMD 68. The assistive information includes, but is not limited to, credentials to access the database 14 and the current location of the vehicle 10. The mobile device 48 transmits the data query, including the assistive information received from the vehicle 10, to the database 14. The mobile device 48 preferably includes a 4G/5G modem to communicate with the database 14, although the mobile device 48 can communicate with the database 14 in any suitable manner. The database 14 transmits data responsive to the data query to the mobile device 48. The received data is transmitted from the mobile device 48 to the HMD 68. The user 46 can access the received data with the HMD 68.

The HMD 68, as shown in FIG. 11, allows the vehicle data delivery system 12 to present augmented-reality content. Alternatively, the mobile device 48 or the display 16 of the IVI 22 can display a view from a sensor 70 disposed in the vehicle, such as a camera, and annotate on the display data content received from the database 14. When the mobile device 48 is used to display the received data content from the database 14, the mobile device 48 receives precise localization information from the vehicle 10, such as an accurate GPS location, inertial measurement/accelerometer readings, data about prediction motion from vehicle maps, to accurately position and display the data content received from the database 14. The received data content is configured to be superimposed on a real-world display displayed by the display, such as a mobile device 48 or an HMD 68. In other words, the received data content is integrated with the real-world environment captured by the display.

The display device, such as the display 16 of the IVI, the mobile device 48, or the HMD 68, can allow interaction such that the user can see the received data content and request further information regarding the received data content. The user 46 can tap the screen of the display 16 or the mobile device 48, or can use a controller or a haptic glove to interact with the display device.

The user interface 24 can be integrated with the display device, as an overlay or a drop-down menu, so the user 46 can select and search items while viewing data content received from the database 14. Alternatively, the user interface 24 can be a separate application from the application used to view the received data content.

The display device can be a display device configured to display augmented-reality (AR) or virtual reality (VR) content, such as the HMD 68. The HMD 68 is paired with the mobile device 48, as shown in FIG. 11. Alternatively, the HMD 68 s paired directly with the wireless communication system 20 of the vehicle 10, such as by Bluetooth or local area network. As shown in FIG. 11, the HMD 68 receives the data content from the database 14 from the mobile device 48. Alternatively, when the HMD 68 is directly paired with the vehicle 10, the HMD receives the data content from the wireless communication system 20 of the vehicle 10. Alternatively, the HMD 68 can receive the data content from the mobile device 48, which receives the data content from the wireless communication system 20 of the vehicle 10.

The user 46 can look around using the device and sees the received data content overlaid on top of the world. The image is reproduced through a sensor 70 of the vehicle 10 or through a camera of the mobile device 50. The image is directly viewed by the user when using the HMD 68. Alternatively, the user may instead take a top-down view from outside the car, and look at a map or representation of the world around the moving vehicle 10. The top-down view can more accurately display lines and regions on the map. A top-down view is readily available from existing providers. The received data content from the database 14 can be presented in a plurality of methods, such as, but not limited to, colored regions, numbers or figures, lines of text, images, localized videos, and multimedia pages, such as HTML web pages. The user can configure each data content of the received data content through the dashboard 66 of the user interface 24 to set the preferred method of presentation, such as, but not limited to, continuous color scale, discrete color scale, and numerical data or no numerical data. The user can further configure through the dashboard 66 the preferred display device for the received data content, such as AR/VR via an HMD or a simpler presentation on the mobile device 48. The user can further configure the level of detail of each received data content.

Geocoordinate data is preferably used to localize point of interest and other information. Alternatively, image recognition can be used to tag specific identifiable landmarks, such as a distinctive landmark, such as a mountain or a building, with information. An image-recognition pipeline can be used to facilitate tagging the object through image recognition. Image processing software running on the mobile device 48 receives, as an additional category from the database 14, the recognition information necessary to identify the object or point of interest (POI) in question. When the user points the display device at the object, the cameras identify the object and can more precisely map the relevant information onto it.

When the data content transmitted by the database 14 involves multimedia content, including audio, the data content can be delivered via the mobile device 48, as shown in FIGS. 6 and 8, or the data content can be delivered via the vehicle 10, as shown in FIGS. 5 and 7. The IVI 22 of the vehicle 10 is preferably equipped with appropriate individualized speakers or directional sound capabilities to project the received data content to the specific vehicle occupant requesting the data content.

Data delivery applications can be configured to use information about a driver alertness level, such as a state and activity of the driver, to decide what received data content is appropriate to display, where the received data content is appropriate to display, and when the received data content is appropriate to display. When the driver is determined to be driving, such as with the sensor 70, the received data content can be displayed on the display 16 of the IVI 22. When the driver is determined to not be driving, such as when the vehicle is in an autonomous drive mode, the received data content can be displayed on the HMD 68. When the sensor 70, such as a heartrate monitor, determines the driver is in a burdened state while driving, such as driving in a downtown area, an overview of the received data content is displayed on the display 16. Alternatively, the delivered data is prevented from being displayed based on the estimated burden of the driver. The delivered data can be prevented from being displayed when the driver is determined to be burdened, and the delivered data is stored in the storage 26 until the driver is determined to not be burdened. When the driver is determined to be navigating a difficult intersection, such as by the sensor 70 and the navigation system 18, the received data content is prevented from displayed until the driver is operating the vehicle in a less burdensome area. When the sensor 70 determines the driver is not burdened while driving, such as on a lightly trafficked highway, more detailed information from the received data content is displayed on the display 16. Determinations regarding the situation in which the vehicle is being operated can be made through a combination of the vehicle location determined by the navigation system 18, an operating mode of vehicle 10 determined by the controller 28, and driver monitoring systems that assess driver distraction or driver burden with the sensor 70. The alertness level of the driver, such as whether the driver is in a burdened state or in a detected to driver activity, is used to determine whether to present the received data content on the display 16.

Figure 12:
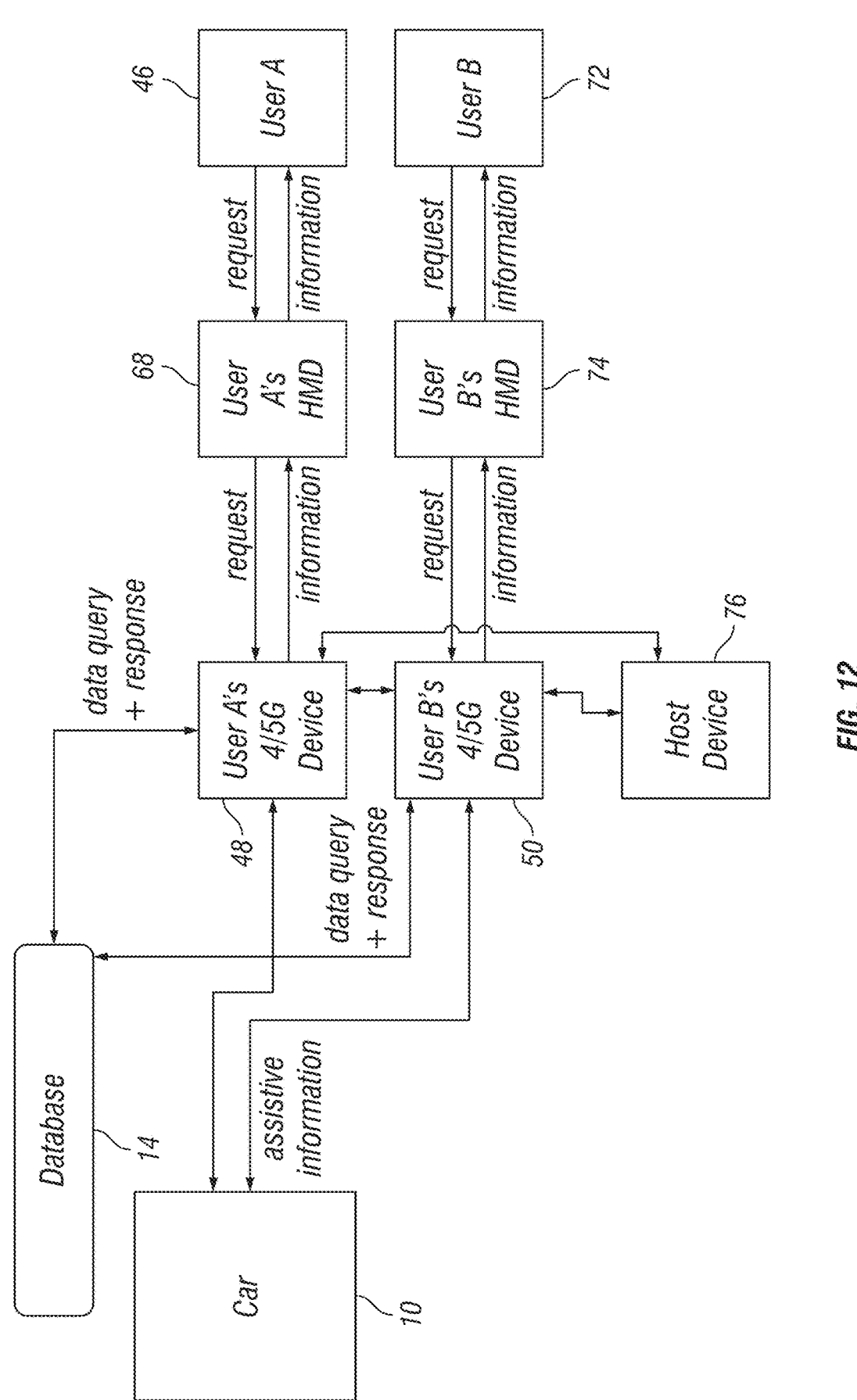
FIG. 12 is a schematic illustration of the vehicle delivery system for multiple users in a vehicle.

As shown in FIG. 12, a plurality of users 46 and 72 within the same vehicle 10 may collaboratively view the same received data content using different mobile devices 48 and 50. The first occupant 46 can request data content through the first mobile device 48, and the requested data content is transmitted from the database 14 to the first mobile device 48. The first mobile device 48 can share the received data content with the second mobile device 50, such that the first and second users 46 and 72 can view the received data content on respective HMD's 68 and 74. Alternatively, each of the first and second users 46 and 72 can separately request and view data content from the database 14, as shown in FIG. 12. Alternatively, a host device 76 can track the interactions of each user 46 and 72, and provide interactions between each of the users. The host device 76 can be either of the mobile devices 48 and 50, or can be the IVI 22 of the vehicle 10. The host device 76 can store the data content received from the database 14, and allow access to the stored device from any connected device, such as the mobile devices 48 and 50. A plurality of devices 16, 48 and 50 can be disposed in the vehicle 10, and one of the devices can be selected on which to display the delivered data.

Figure 13:
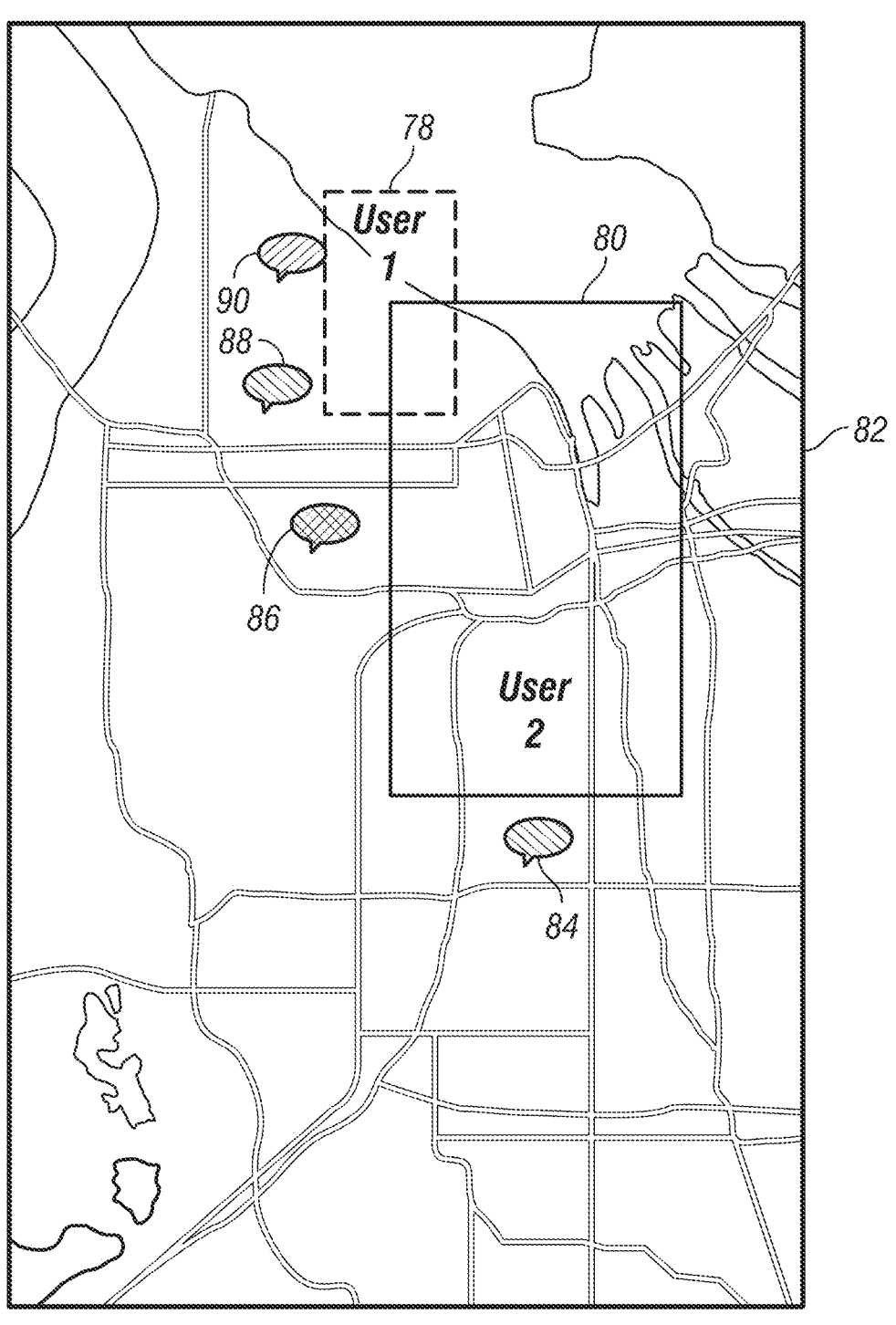
FIG. 13 is a schematic illustration of the vehicle delivery system illustrating multiple users on a geographical map.

As shown in FIG. 12, one of the users 72 in the vehicle 10 can then see the data content the other user 46 is viewing and in what area the other user 46 is viewing. As shown in FIG. 13, an area 78 being viewed by the first user 46 is indicated in a first color. An area 80 being viewed by the second user 72 is indicated in a second color. The second color is different from the first color. Each of the first and second users 46 and 72 can easily determine an area that the other user is viewing in a map 82. The map 82 further displays comments 84, 86, 88 and 90 generated and uploaded to the database 14 by other users. The delivered data is superimposed on the map 82 displayed on the display. Requests for data are transmitted from each of the mobile devices 48 and 50 in the vehicle 10. Each request being initiated by a different user 46 and 72, as shown in FIG. 12. As shown in FIG. 13, a location associated with each user request is displayed on the map 82 of the display screen associated with the mobile device 48 and 50 of each user such that the location associated with each user is visible on the display screen of each user.

Figure 14:
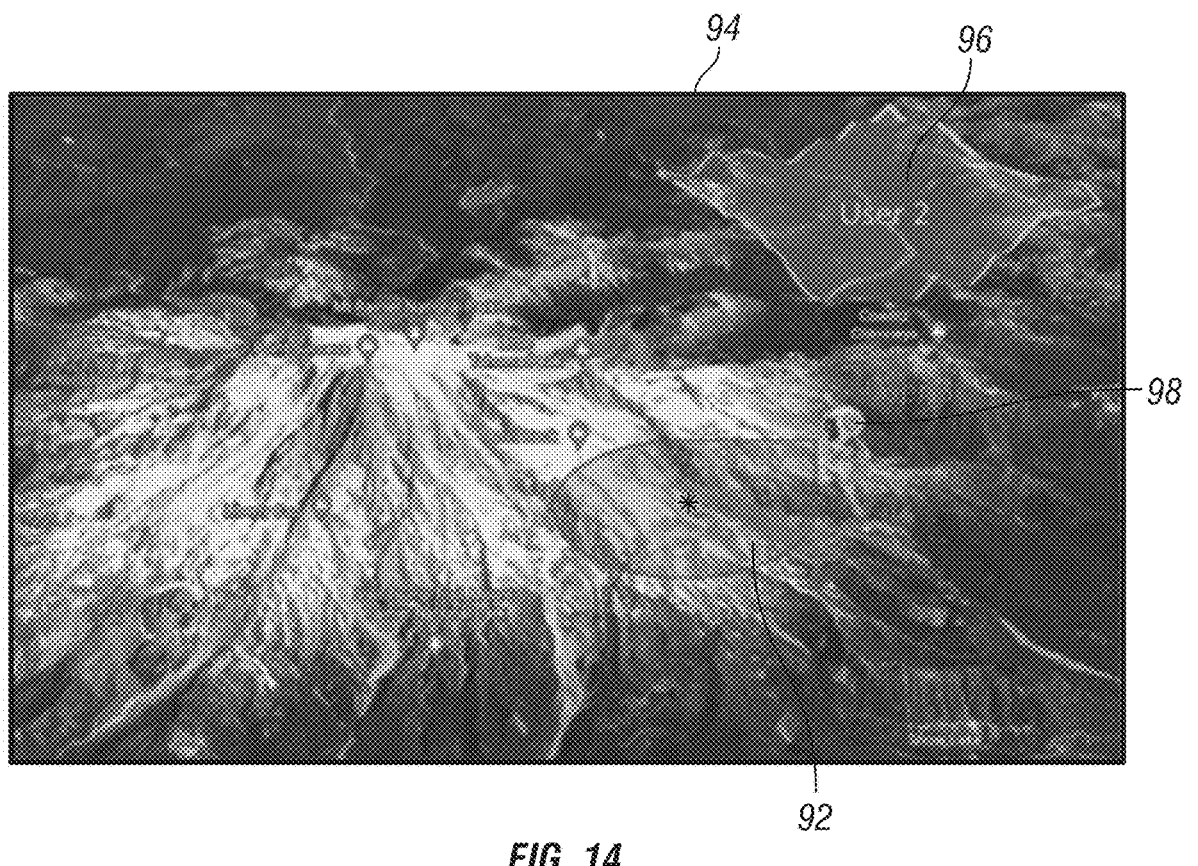
FIG. 14 is a schematic illustration of the vehicle delivery system illustrating multiple users on a topographical map.

Alternatively, as shown in FIG. 14, an area 92 being viewed by the first user 46 is indicated in a first color on a topographic map 94. An area 96 being viewed by the second user 72 is indicated in a second color on the map 94. An avatar 98 associated with the first user 46 can be displayed on the map 94 in association with the area 92. The avatar 98 can be displayed when generated by the user, or can be indicative of the type of device being used by the user, such as an HMD. The abstract area 94 associated with the second user 72 can be indicative of the second user viewing the data content with a non-HMD device, such as a smartphone or tablet.

In combination with these features, the first and second users 46 and 72 in the vehicle 10 can communicate with each other within the data delivery system 12. The data delivery system 12 can include text or video chatrooms allowing the first and second users 46 and 72 to communicate. The data delivery system 12 can further provide written or audio-visual notes that are spatialized within the virtual space and tagged to specific objects, locations, or bits of data allowing the first and second users 46 and 72 to communicate with one another.

Figure 15:
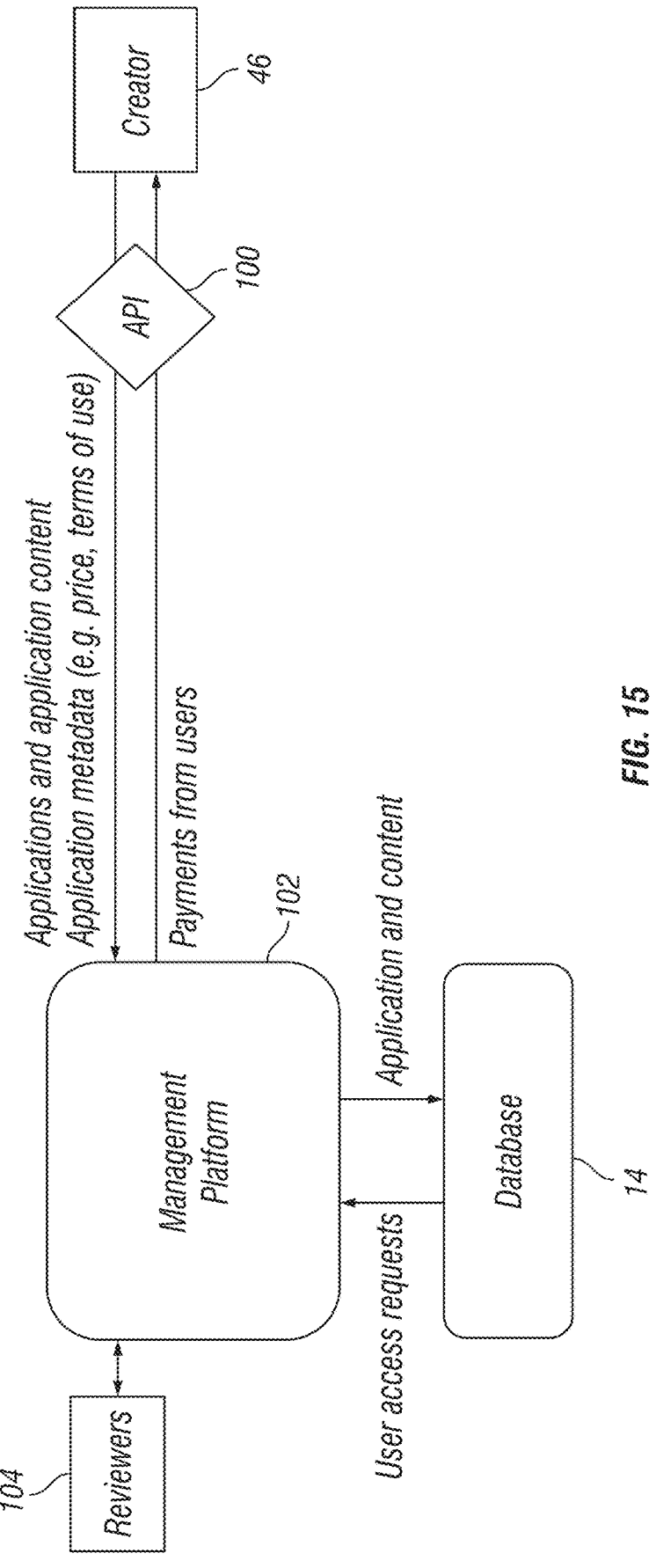
FIG. 15 is a schematic illustration of a system of generating and providing data to a database.

As shown in FIG. 15, the user 46 can generate and upload data to the database 14. The user 46 generates data content using a development environment and an application programming interface (API) 100 stored on the mobile device 48 (FIG. 2). Alternatively, the user 46 can register with the database 14, and receive an interface to facilitate generating and uploading data content to the database 14. The generated content is uploaded by the user 46 to a management platform 102. The generated content can include, but is not limited to, metadata that identifies the application type, price/tiers, search term metadata, subscription length and specific terms of service. The management platform 102 processes the generated data content and makes the generated data content available in the database 14. The management platform 102 can review the generated data content for content not suitable for the database 14, such as adult or restricted content. The management platform 102 can be programmed to review the generated data content for unsuitable material, or the generated data content can be transmitted to reviewers 104 that review the generated data content and indicate whether the generated data content can be uploaded to the database 14. When the generated data content stored in the database 14 requires a subscription for viewing, the management platform 102 transmits the payments to the user 46 that generated the data content.

Figure 16:
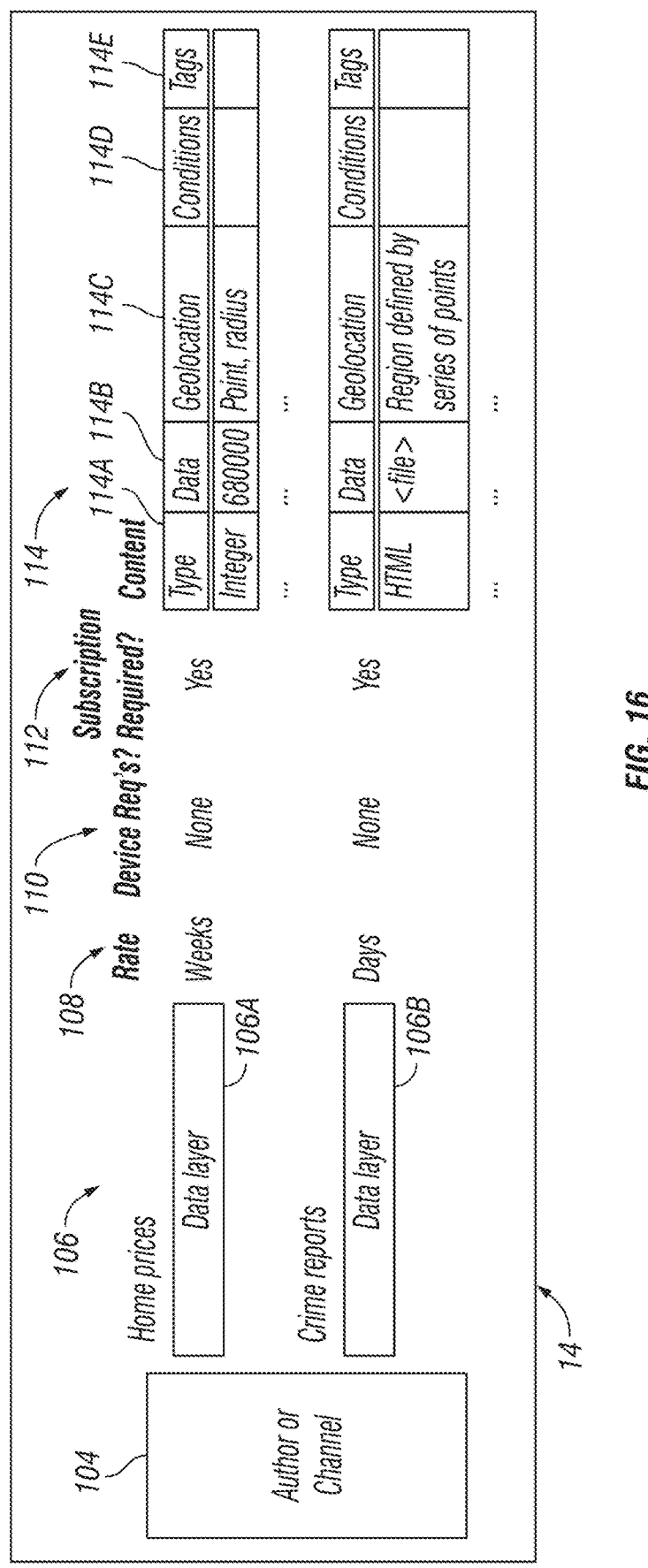
FIG. 16 is schematic illustration of a layout of the database.

Another exemplary layout of the database 14 is shown in FIG. 16. The layout illustrated in FIG. 16 integrates data content generated and uploaded by a user. The layout includes an author or channel layer 104, a subject matter layer 106, a rate or timescale layer 108, a device layer 110, a subscription layer 112, and a content layer 114. The layout of FIG. 9 can be combined with the layout of FIG. 16. The subject matter of the layout of FIG. 9 can be tagged with database, or other suitable identifier, as the author to combine a single layout for the database 14.

The author or channel layer 104 identifies the creator of the data content associated with the author or channel. The information can include the name of the user that generated the content and/or the name of the channel, the amount of time the user has been active on the service, and whether the user is a personal creator or a corporate entity, such as a university.

The subject matter layer 106 indicates the subject matter of the content created by the user. As shown in FIG. 16, the author or channel layer includes a home prices layer 106A and a crime reports layer 106B. The subject matter of the generated content can be identified by the user generating the content. Each author or channel can have multiple database layers 106 directed to the data content generated, and can have diverse geolocation data.

The rate or timescale layer 108 is associated with each subject matter layer 106, as shown in FIG. 16. The rate or timescale layer 108 controls how frequently the content of the subject matter layer 106 is refreshed. For example, the home prices layer 106A is refreshed every few weeks, such as after two weeks. The crime reports layer 106B is refreshed every few days, such as after two days. The rate or timescale layer 108 can be set to refresh the data of the subject matter layer 106 at any suitable interval based on the type of content stored with the subject matter layer.

The device layer 110 indicates whether a particular device is required to view the content of the subject matter layer 106. For example, both the home prices layer 106A and the crime reports layer 106B can be viewed with any device, and a particular device is not required. The device layer 110 can indicated that the device is AR-capable, VR-capable, or an HMD. The generated data content uploaded to the database 14 can be tagged with the type of display configured to display the uploaded data.

The subscription layer 112 indicates whether a subscription is required to access the data content, as shown in FIG. 16. For example, both the home prices layer 106A and the crime reports layer 106B require a subscription to access the data content. The user that generates the data content can designate whether the generated data content requires a subscription to access the content. The user can further set the fee required to access the generated data content.

The content layer 114 includes a plurality of sub-layers, such as a type of content sub-layer 114A, a data sub-layer 114B, a geolocation sub-layer 114C, a conditions sub-layer, and a tag sub-layer 114E. The content sub-layer 114A indicates the type of content stored for the subject matter layer 104. The data sub-layer 114B includes the stored data for the subject matter layer 104. The geolocation sub-layer 114C indicates the location for the subject matter layer 104. The conditions sub-layer 114D indicates conditions for access to the data content of the subject matter layer 104. The conditions sub-layer 114D can set Boolean or inequality conditions that allow targeted content to the specified conditions, such as weather conditions (i.e., raining), temperature (i.e., less than 68 degrees F.), and day of the week (i.e., Friday). The tag sub-layer 114E indicates the category of the subject matter layer 104. The generated data content uploaded to the database 14 includes the data content 114B tagged with the content type 114A, the location 114C, conditions 114D, and other tags 114E. The location information is determined by the navigation system 18 of the vehicle 10.

As shown in FIG. 16, the home prices content layer 104A includes an integer as the type of content stored in the content sub-layer 114A. The data sub-layer 114B stores the integer for the home prices content sub-layer 114A. The geolocation sub-layer 114C includes a point at which the historical subject matter is located, and a radius from the point to set an area associated with the home prices content layer 114A. The conditions sub-layer 114D identifies any particular conditions required to access the data content, and no conditions are specified. The tag sub-layer 114E identifies the category of the home prices content layer 114A, and a category is not specified. The database 14 returns the content associated with the home prices content layer 114A when the current location of the vehicle 10 is within the area defined by the geolocation sub-layer 114C and when any conditions specified in the conditions sub-layer 114D are met.

As shown in FIG. 16, the crime report content layer 104B includes HTML as the type of content stored in the content sub-layer 114A. The data sub-layer 114B stores the file for the crime report content layer 114B. The geolocation sub-layer 114C includes a region defined by a series of points for the area associated with the crime report content. The conditions sub-layer 114D identifies any particular conditions required to access the data content, and no conditions are specified. The tag sub-layer 114E identifies the category of the crime reports layer 114B, and a category is not specified. The database 14 returns the content associated with the crime reports layer 114B when the current location of the vehicle 10 is within the area defined in the geolocation sub-layer 114C.

A device of the user can include a generation interface that allows the user to generate and upload data content to the database 14. The user, i.e., an author or channel, can sign up for a service and receive credential to log in. Upon logging in, the user is presented with a dashboard that allows the user to create/curate/upload data content. The interface provides information about how the generated data content must be formatted to be accepted by the service, and can include various tools to facilitate inputting the data content. The interface allows the user to create different data layers within the channel.

Each data layer involves a name, and metadata about the type of data, the display parameters allowed (such as 2D, 3D; smartphone, or HMD), and the pricing structure for the data layer. The data layer can also include connections to the raw database entries that make up the data layer, and any custom views or viewing applications defined by the user. Within each data layer, the user can edit the data associated with that layer and configure display parameters necessary or optional for accessing the data content. The user can also identify whether a subscription is required to access the data content, and can set pricing.

The interface can further provide a map view to allow the user to see and edit their data in virtual space, as well as providing direct access to the database entries for batch editing. Authoring can happen on the map view by selecting a point location, a point and radius, or a region defined by a set of points, and creating a data entry associated with that region. Correctly formatted tables can be uploaded to the service to do bulk creation of data items. Data entries can include: audio, 2D video, 3D video, and/or static or dynamic (interactive) 3D AR/VR/mixed reality experiences, such as a virtual character who tells a story in a particular region of the world. A variety of basic interaction features, such as comments (84, 86, 88 and 90, FIG. 13), ratings, and live chat, can be selected or deselected for individual data items. The data can be presented as a virtual pin on a 2D map or 3D representation of the world, which can trigger the data content when the vehicle 10 is within a predetermined distance. The users can switch between different views when supported by the hardware of the display device being used. Alternatively, data streams can be limited to a specified display device, as indicated by the device content layer 110 of the interface of FIG. 16.

The user can define a custom view using the API 100 (FIG. 15) and upload the custom view to enable features beyond the defaults, such as animated avatars instead of pins, or fully interactive experiences that load up within certain regions. Scripts and automations can be configured to regularly update a particular dataset. Automatic notifications can be configured to let a user know that certain data types are getting stale and should be updated. A notification is transmitted to the creator of the uploaded data to notify the creator to update the uploaded data. The user can produce more complicated applications, such as AR based interactive or storytelling experiences, using external authoring tools, such as game development platforms, and the API 100 (FIG. 15) that provides hooks to allow the integration of the generated experiences into database 14.

Figure 17:
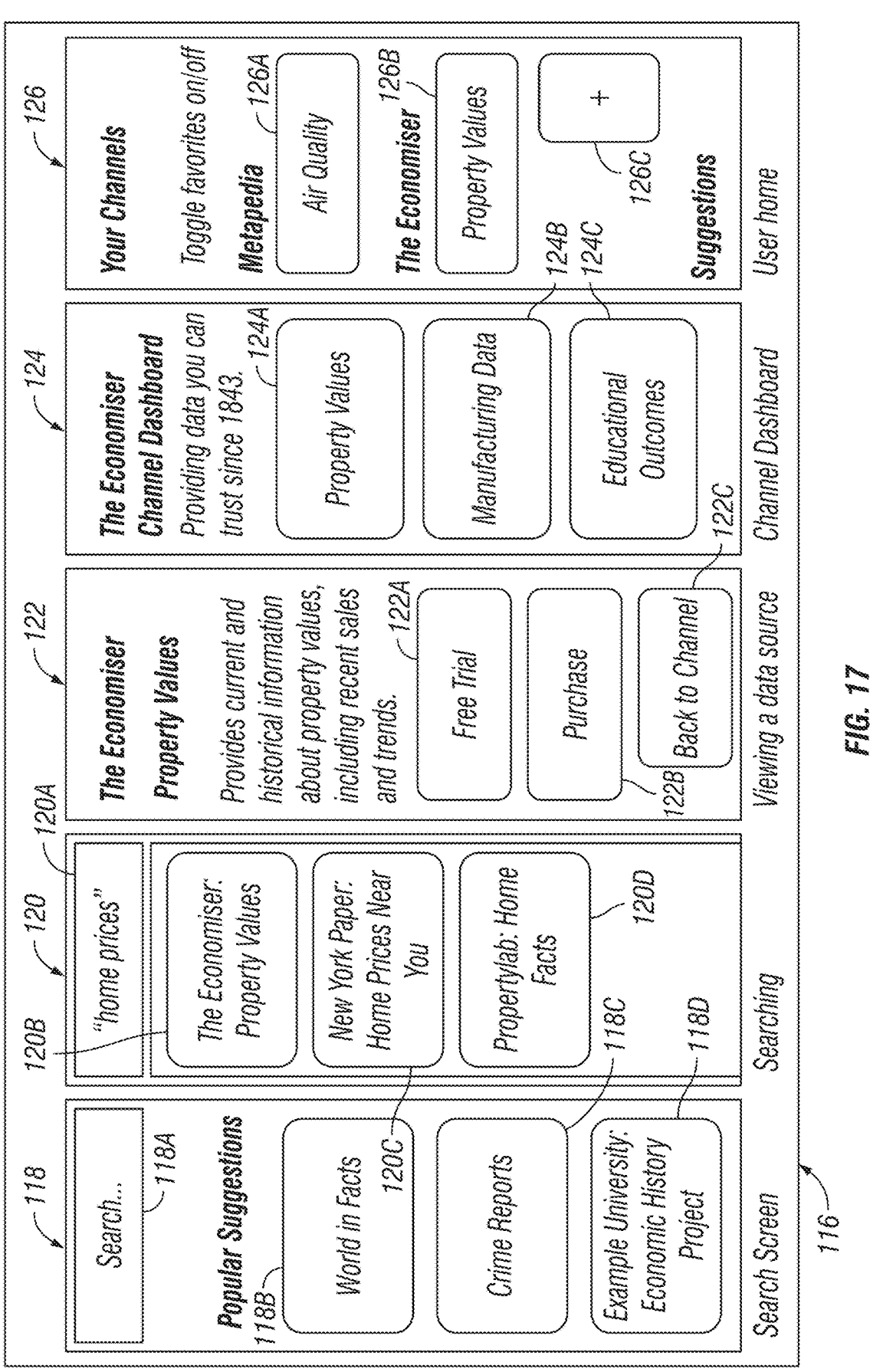
FIG. 17 is a schematic illustration of another exemplary interface for the vehicle delivery system.

A user interface 116 presents a searchable interface to the user, as shown in FIG. 17. The user interface 116 provides access to data stored in the database 14, as shown in FIG. 16. The user can interact with the user interface 116 directly through the interface presented on the display 16 of the IVI 22 or through a mobile device 48. The mobile device 48 includes an application that communicates with the wireless communication system 20 of the vehicle 10 in any suitable manner, such as by Bluetooth or local WiFi. The dashboard 116 can be separate from the dashboard 24 of FIG. 10 to separately search for user generated content in the database 14, or the dashboards 24 and 116 can be combined to search for all the content stored in the database 14.

The user interface 116 presents a search screen 118, as shown in FIG. 16. The search screen 118 displays a search window 118A in which the user can enter a specific search request to be transmitted to the database 14. Alternatively, clickable buttons 118B, 118C and 118D are displayed in which popular suggestions are presented. Button 118B presents a world in facts option, button 118C presents a crime reports option, and button 118C presents an option for an economic history project. The popular suggestions can be based on the most requested searches for a particular area, or any other suitable manner of ranking searches.

The user interface 116 further presents a searching screen 120, as shown in FIG. 16. When the user enters home prices in the search window 118A in the search screen 118, the searching window displays the search term in the searching window 120A and displays at least one clickable button 120B as the search result. The user can click one of the clickable buttons 120B, 120C and 120D to receive the data returned from the database 14 responsive to the search query. A first clickable button 120B returns property values from the Economiser channel. A second clickable button 120C returns home prices from a New York Paper channel. A third clickable button 120D returns home facts from a Propertylab channel.

The user interface 116 further presents a search results screen 122, as shown in FIG. 16. The search results screen 122 presents the results when the first clickable button 120B on the searching screen 120 is pressed. A first clickable button 122A allows the user to initiate a free trial of the Economiser channel. A second clickable button 122B allows the user to purchase a subscription to the Economiser channel. A third clickable button 122C returns the user to the Economiser channel dashboard 124.

The user interface 116 further presents a dashboard screen 124 for the Economiser, as shown in FIG. 16. A plurality of clickable buttons 124A, 124B and 124C are displayed corresponding to data content generated by the channel. A first clickable button 124A allows the user to access property values compiled by the Economiser. A second clickable button 124B allows the user to access manufacturing data compiled by the Economiser. A third clickable button 124C allows the user to access educational outcomes data content generated by the Economiser.

A home screen 126 includes a plurality of clickable buttons 126A and 126B corresponding to channels designated as favorites by the user. The first clickable button 126A is air quality data content compiled on the Metapedia channel. The second clickable button 126B is property values compiled on the Economiser channel. A third clickable button 126 includes a plus sign, which displays additional clickable buttons directed to other data content saved to the dashboard. The home screen 126 can be configured to display all the subscribed data content, the paid data content, and the trial data content. The home screen 126 can further be configured to allow for a search for data content, as well as displaying suggested data content.

Data content can be suggested in the user interfaces 24 and 116, as shown in FIGS. 10 and 17, using demographic information about an owner of the vehicle 10. The demographic information can be input by the owner through the interface, or can be input upon purchase of the vehicle at the dealership. A conventional recommendation algorithm stored in a learning module 128 can be used to provide data content suggestions based on the inputted demographic information. The suggested data content combines a mix of:

globally popular content, and content popular with people with similar profiles. A search history input through the interfaces 24 and 116 can be stored and used to suggest data content similar to past searches. The user can like, thumbs up, or otherwise indicate appreciation for a channel or data content, which can then be used to select similar data content for suggestions. Data content and channels can be recommended to the user based on data content and channels liked by other users having similar likes, but that the user has not yet accessed. The user can be suggested data content and channels based on a measured amount of viewing time measured, which is used to estimate whether a person would like to see more of a certain type of data content. The sensor 70 (FIG. 2), such as a camera, mounted in the passenger compartment of the vehicle 10 can monitor facial expressions of vehicle occupants who are viewing information, and use the sensed information to estimate whether the vehicle occupant would like to see more of a certain type of data content. The sensor 70 determines a reaction of the user to the displayed data disposed in the vehicle 10, and suggests a data topic based on the reaction of the user to the displayed data. The collected personalized information for the user can be used to provide home-page suggestions and to tailor searches. The collected personalized information can also be used to suggest data content and channels to the user when they start the application, or begin a journey, or at particular points in the journey.

Referring to FIG. 3, the system 12 can display nearby users using the system 12 and viewing data content. Another vehicle 36 is nearby the vehicle 10 and traveling along the same road 44. As shown in FIG. 13, user 1 corresponds to the user in the vehicle 10 and user 2 corresponds to the user in the other vehicle 36. Comments 84, 86, 88 and 90 can appear in real time on the map 82. Alternatively, a general location of each of the vehicles 10 and 36 can be illustrated on the map 82. Alternatively, the map 92 can illustrate the general location of each of the users in the vehicles 10 and 36 as avatars when VR or AR information is shown.

The data and delivery system 12 in accordance with the present disclosure delivers data to a vehicle based on a current location of the vehicle to further educate and provide knowledge to occupants of a vehicle while traveling.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the method and system of delivering data to a vehicle. Accordingly, these terms, as utilized to describe the present invention should be interpreted relative to a vehicle equipped with the method and system of delivering data to a vehicle.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of delivering data to a vehicle, comprising:
transmitting a request for the data from a vehicle to a remote database, the data stored in the database being tagged with location information;
determining a location of the vehicle;
determining the data in the database tagged with location information within a predetermined distance of the determined location of the vehicle, the predetermined distance being user settable;
delivering the data from the remote database to the vehicle based on the determined location of the vehicle and on a burdened state of a driver, wherein the burdened state is determined from a state of a driver and a difficulty of a driving area; and
displaying the delivered data on a display disposed in the vehicle.

2. The method according to claim 1,
further comprising inputting a destination in a navigation system of the vehicle;
determining a route to the destination;
determining the data in the database tagged with location information along the route of the vehicle;
delivering the data to the vehicle based on the route of the vehicle; and
displaying the delivered data on the display located in the vehicle.

3. The method according to claim 1, further comprising uploading data to the database, the uploaded data being tagged with location information.

4. The method according to claim 3, wherein
the uploaded data is tagged with a type of display configured to display the uploaded data.

5. The method according to claim 3, further comprising
the location information for the uploaded data being determined by a navigation system of the vehicle.

6. The method according to claim 1, wherein
the transmitted request is based on a search query input through an interface disposed in the vehicle.

7. The method according to claim 1, wherein
multiple requests for the data are transmitted from the vehicle, each request being initiated by a different user; and
a location associated with each user request is displayed on a map of a display screen associated with each user such that the location associated with each user is visible on the display screen of each user.

8. The method according to claim 1, further comprising
suggesting a data topic based on past transmitted requests.

9. The method according to claim 1, further comprising
determining a reaction of a user to the displayed data with a sensor disposed in the vehicle; and
suggesting a data topic based on the reaction of the user to the displayed data.

10. The method according to claim 3, further comprising
transmitting a notification to a creator of the uploaded data to update the uploaded data.

11. The method according to claim 1, further comprising
disposing a plurality of devices in the vehicle; and
selecting the one device of the plurality of device on which to display the delivered data.

12. The method according to claim 1, wherein
the delivered data is superimposed on a map displayed on the display.

13. The method according to claim 1, further comprising
preventing the delivered data from being displayed based on an estimated alertness level of a driver.

14. A vehicle data delivery system, comprising:
a remote database configured to store data, the data stored in the database being tagged with location information;
a navigational system disposed in a vehicle and configured to determine a location of the vehicle;
a wireless communication system disposed in the vehicle and configured to transmit requests from the vehicle to the database and to receive data delivered by the database based on the determined location of the vehicle and on a burdened state of a driver, wherein the burdened state is determined from a state of a driver and a difficulty of a driving area, the delivered data tagged with location information within a predetermined distance of the determined location of the vehicle, the predetermined distance being user settable; and
a first display disposed in the vehicle and configured to display the data delivered from the database.

15. The vehicle data delivery system according to claim 14, wherein
a controller disposed in the vehicle and configured to prevent the delivered data from being displayed on the first display based on an estimated alertness level of a driver of the vehicle.

16. The vehicle data delivery system according to claim 15, wherein
the estimated alertness level of the driver of the vehicle is determined based on information detected by a sensor disposed in the vehicle.

17. The vehicle data delivery system according to claim 14, wherein the first display is a display screen of an in-vehicle infotainment system or a head-mounted display.

18. The vehicle data delivery system according to claim 14, wherein a second display disposed in the vehicle and configured to display the data delivered from the database, the second display being different from the first display.

19. The vehicle data delivery system according to claim 14, wherein the delivered data is superimposed on a map displayed on the first display.

20. The vehicle data delivery system according to claim 19, wherein the delivered data is superimposed on a real-world display displayed by the first display.

* * * * *